(12) United States Patent  
Kohno et al.

(10) Patent No.: US 6,462,784 B1
(45) Date of Patent: Oct. 8, 2002

(54) APPARATUS AND METHOD FOR DISPLAYING PROGRAM CONTENTS (EPG)

(75) Inventors: Tetsuya Kohno, Kanagawa; Atsuko Deguchi, Tokyo; Kazuhiro Akaike, Kanagawa; Satoshi Iino, Kanagawa; Yukiko Machiyama, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/267,340

(22) Filed: Mar. 15, 1999

(30) Foreign Application Priority Data

Mar. 16, 1998 (JP) .......................... 10-065324

(51) Int. Cl.$^7$ ...................... H04N 5/50; H04N 505/445
(52) U.S. Cl. ...................... 348/563; 348/564; 348/569; 348/565; 348/906; 725/56; 725/52; 725/39; 725/40
(58) Field of Search ................. 348/563, 569, 348/570, 906, 564, 552, 565; 725/39, 40, 45, 52, 56; H04N 5/50, 5/445

(56) References Cited

U.S. PATENT DOCUMENTS

| | | | | |
|---|---|---|---|---|
| 5,793,438 A | * | 8/1998 | Bedard | 348/569 |
| 5,880,768 A | * | 3/1999 | Lemmons et al. | 348/1 |
| 5,917,873 A | * | 6/1999 | Shiomoto et al. | 375/376 |
| 6,005,601 A | * | 12/1999 | Ohkura et al. | 348/7 |
| 6,128,009 A | * | 10/2000 | Ohkura et al. | 345/327 |
| 6,133,962 A | * | 10/2000 | Prochi et al. | 348/569 |
| 6,163,345 A | * | 12/2000 | Noguchi et al. | 348/564 |
| 6,169,543 B1 | * | 1/2001 | Wehmeyer | 345/327 |
| 6,177,931 B1 | * | 1/2001 | Alexander et al. | 345/327 |
| 6,216,264 B1 | * | 4/2001 | Maze et al. | 725/53 |
| 6,057,831 A1 | * | 5/2001 | Harmes | 345/327 |
| 6,243,142 B1 | * | 6/2001 | Mugura et al. | 348/564 |
| 6,323,911 B1 | * | 11/2001 | Schein et al. | 348/552 |

* cited by examiner

Primary Examiner—John Miller
Assistant Examiner—Paulos Natnael
(74) Attorney, Agent, or Firm—Jay H. Maioli

(57) ABSTRACT

An apparatus for displaying the program contents and a method for displaying the program contents in which either the channel condition setting or the category setting can be easily carried out in one screen at any one of the present program table and the program table of specified period of time, wherein there are provided a display having a screen, a selector for selecting and displaying a present program table indicating a title of program being broadcast at present in program data supplied through a broadcasting wave and a program table for specified period of time to indicate a title of program to be broadcast within a predetermined period of time and further displaying the table in the screen of the display in such a way that the present program table and the program table for specified period of time may be provided with a channel condition setting section for sorting channels and a category setting section for sorting categories of programs.

8 Claims, 23 Drawing Sheets

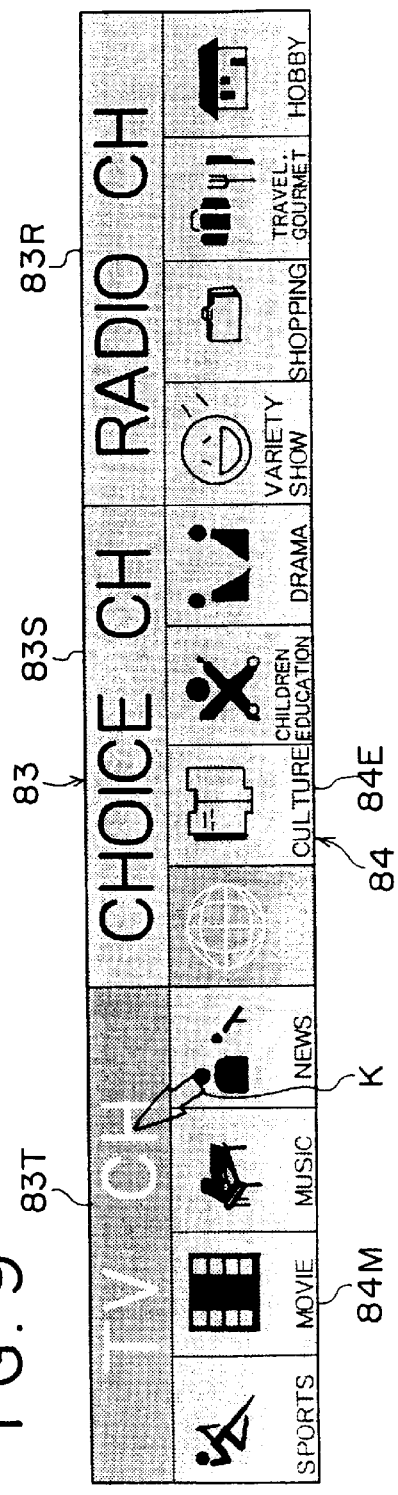
FIG.9
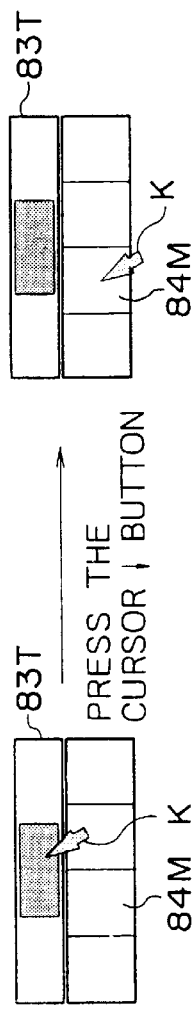
FIG.10A
FIG.10B
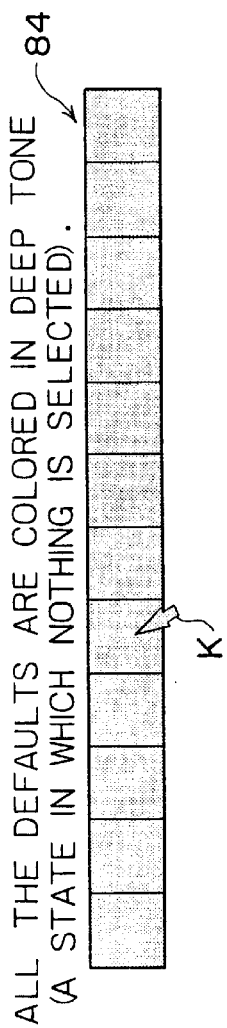
FIG.11

PRESS "DECISION"

DEEP COLOR NOT-SELECTED STATE

LIGHT-UP AN IMAGE AND A LETTER SELECTED STATE

PRESS "DECISION"

LIGHT COLOR OF IMAGE AND LETTER SELECTED STATE

DEEP COLOR NOT-SELECTED STATE

↓ PRESS "DECISION"

FIG.14

CHANGED-OVER SCREENS OF PRESENT PROGRAM AND NEXT PROGRAM WHEN THE PROGRAMS ARE SORTED BY A CATEGORY

EXAMPLE IN WHICH THE CATEGORY IS SET TO "SPORTS".

FIG. 15

| ON-AIR PROGRAM | NEXT PROGRAM |
|---|---|
| THE DRAGON ATTACK !! | BATMAN FOREVER |
| (NEXT PROGRAM IS A MOVIE.) | MONSIGNOR |
| ALL THE PRESIDENT'S MEN | (ON-AIR PROGRAM IS A MOVIE.) |
| (THIS IS NOT A MOVIE.) | (THIS IS NOT A MOVIE.) |

FOR BOTH CASES

ONLY FOR NEXT PROGRAM

ONLY FOR ON-AIR PROGRAM    (THIS IS NOT A TRAVEL PROGRAM
                            OR A GOURMET PROGRAM.)

NO CASES                   (THIS IS NOT A HOBBY PROGRAM.)

FIG. 16

WEEKLY PROGRAM GUIDE (WEEKLY PROGRAM TABLE : PROGRAM TABLE ON SPECIFIED PERIOD) WP

| | 185 | 199 | 187 | 182A | 182 | 181 | 183 | 184 |

TODAY | 25 WED | 26 THU | 27 FRI | 28 SAT | 29 SUN | 30 MON | 1 TUE
■10:00 ■10:30 ■11:00 ■11:30

○ TV CH | CHOICE CH | RADIO CH

AB — 181A

CONFIGURATION OF ONE PROGRAM

FIG.18A

MINIMUM TIME DISPLAYING SECTION

4 DOTS — 182D
8 DOTS

FIG.18B

IN THE CASE THAT TWO ONE-MINUTE PROGRAMS ARE CONSECUTIVE FROM EACH OTHER:

PORTION WHERE TWO SEGMENTS ARE OVERLAPPED FROM EACH OTHER

PRESS THE CURAOR→BUTTON

FIG.18C

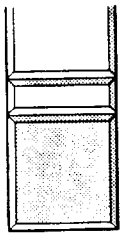

MOVE THE CURSOR IN A RIGHTWARD DIRECTION

PRESS THE CURAOR→BUTTON

FIG.18D

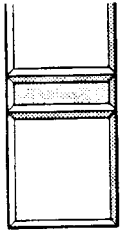

A POSITION OF THE CURSOR IS NOT CHANGED. HOWEVER, THE CONTENTS OF THE PROGRAM INFORMATION ARE SET TO A NEXT PROGRAM.

PRESS THE CURAOR→BUTTON

FIG.18E

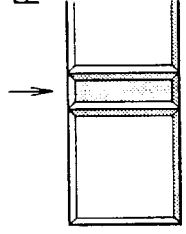

PRESS IT ONCE AGAIN AND MOVE TO THE NEXT SEGMENT

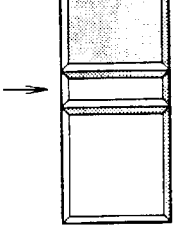

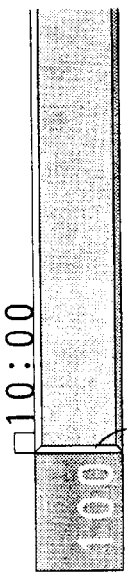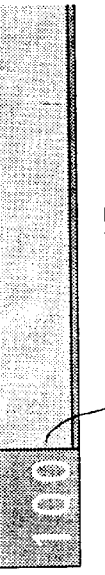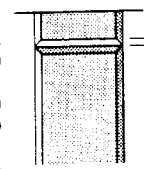

PROCESSING AT AN END SECTION OF SCREEN AT A PROGRAM TITLE DISPLAY SECTION

FIG. 19A
WHEN THE PROGRAM STARTS JUST AT 10:00
EDGE 182G
WHEN THE PROGRAM ENDS JUST AT 0:00
TITLE SEGMENT 182A
EDGE 182F

FIG. 19B
WHEN THE PROGRAM GOES ON BEFORE 10:00
EDGE IS NOT APPLIED.
WHEN THE PROGRAM CONTINUES EVEN AFTER 0:00
182A
EDGE IS NOT APPLIED.

FIG. 19C
WHEN THE PROGRAM ENDS AT 10:00 OR 10:02
6 DOTS / 2 DOTS
HOWEVER, WHEN A PROGRAM JUST AFTER THE PREVIOUS PROGRAM IS OF ONE MINUTE OR TWO MINUTES, 2 DOTS ARE APPLIED. PROGRAM TITLE IS NOT DISPLAYED.

WHEN THE PROGRAM STARTS AT 11:58 OR 11:59
2 DOTS / 6 DOTS
HOWEVER, WHEN A PROGRAM JUST AFTER THE PREVIOUS PROGRAM IS OF ONE MINUTE OR TWO MINUTES, 2 DOTS ARE APPLIED. PROGRAM TITLE IS NOT DISPLAYED.

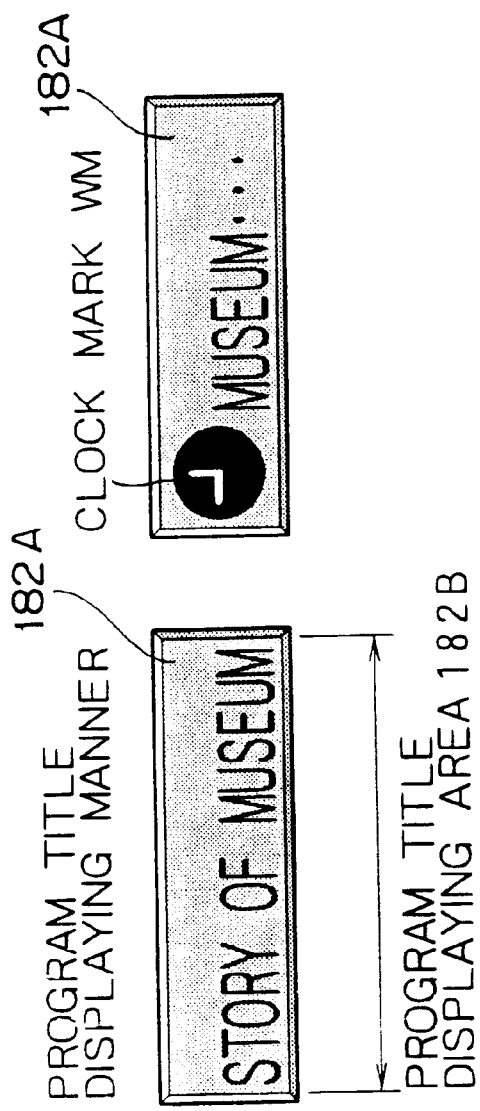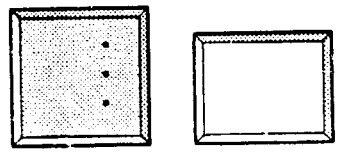

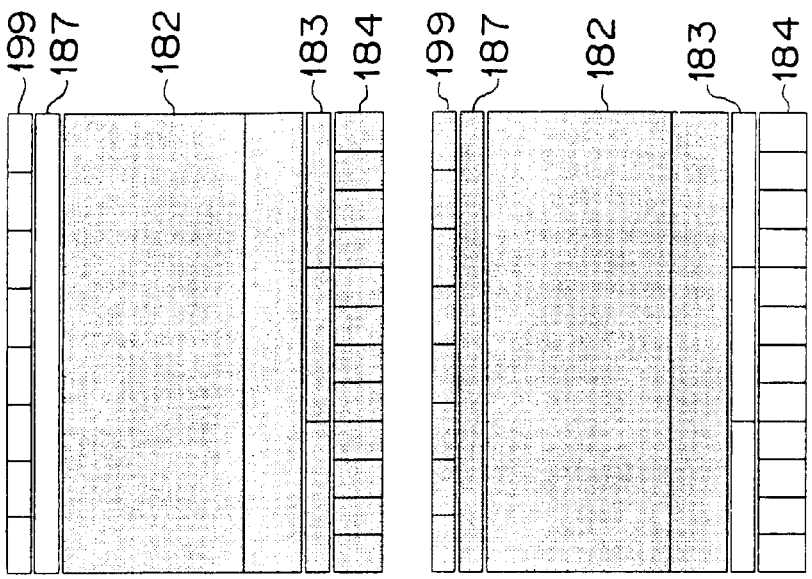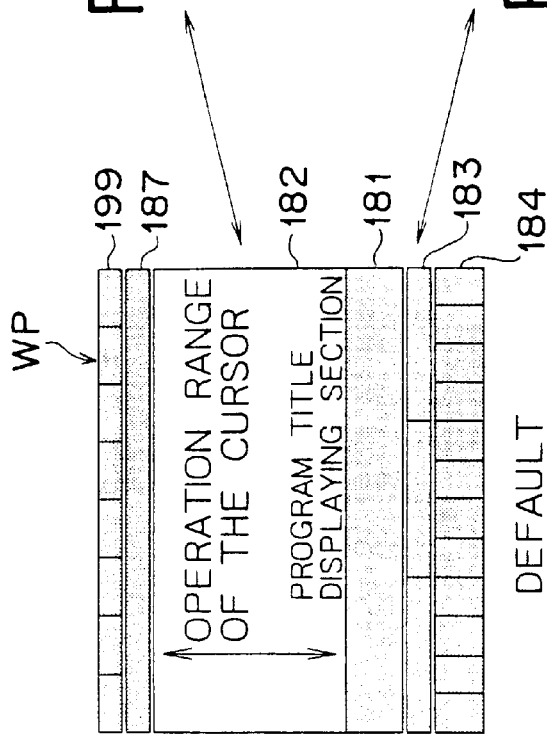

FIG. 22A 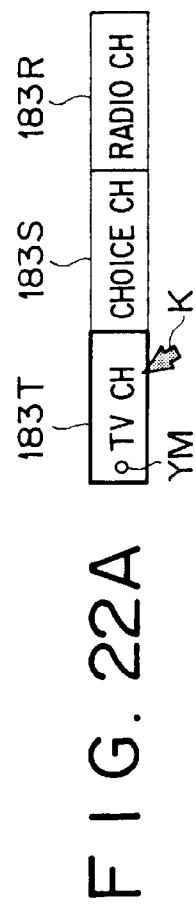

FIG. 22B 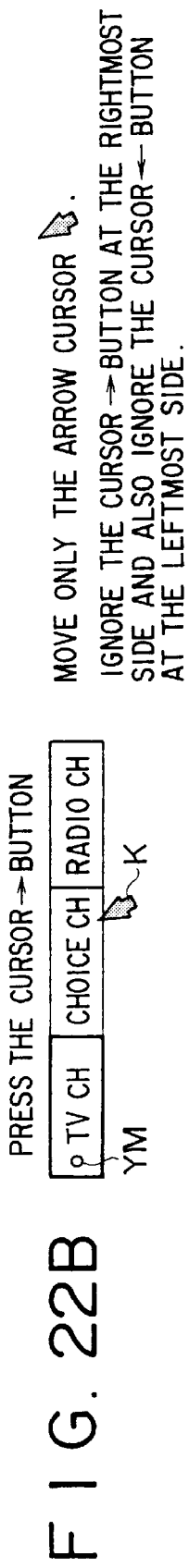

PRESS THE CURSOR → BUTTON

MOVE ONLY THE ARROW CURSOR.

IGNORE THE CURSOR → BUTTON AT THE RIGHTMOST SIDE AND ALSO IGNORE THE CURSOR ← BUTTON AT THE LEFTMOST SIDE.

FIG. 22C 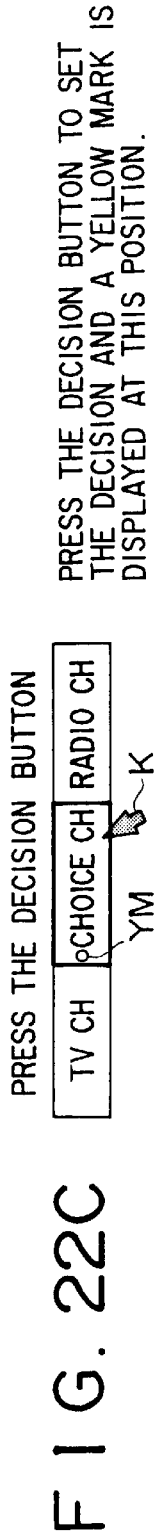

PRESS THE DECISION BUTTON

PRESS THE DECISION BUTTON TO SET THE DECISION AND A YELLOW MARK IS DISPLAYED AT THIS POSITION.

FIG. 22D 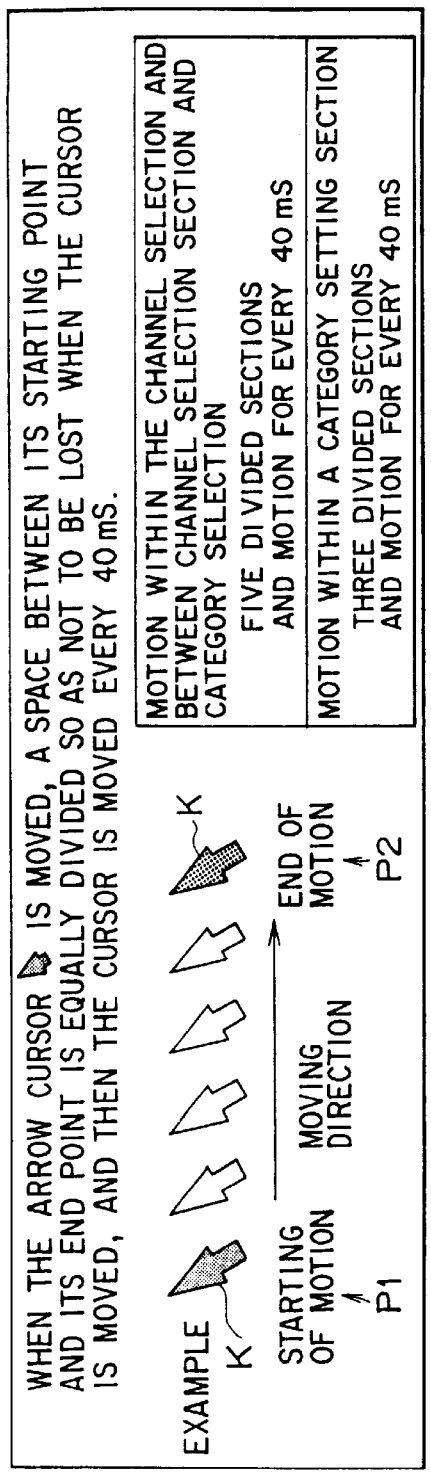

WHEN THE ARROW CURSOR IS MOVED, A SPACE BETWEEN ITS STARTING POINT AND ITS END POINT IS EQUALLY DIVIDED SO AS NOT TO BE LOST WHEN THE CURSOR IS MOVED, AND THEN THE CURSOR IS MOVED EVERY 40 mS.

| MOTION WITHIN THE CHANNEL SELECTION AND BETWEEN CHANNEL SELECTION SECTION AND CATEGORY SELECTION | FIVE DIVIDED SECTIONS AND MOTION FOR EVERY 40 mS |
| MOTION WITHIN A CATEGORY SETTING SECTION | THREE DIVIDED SECTIONS AND MOTION FOR EVERY 40 mS |

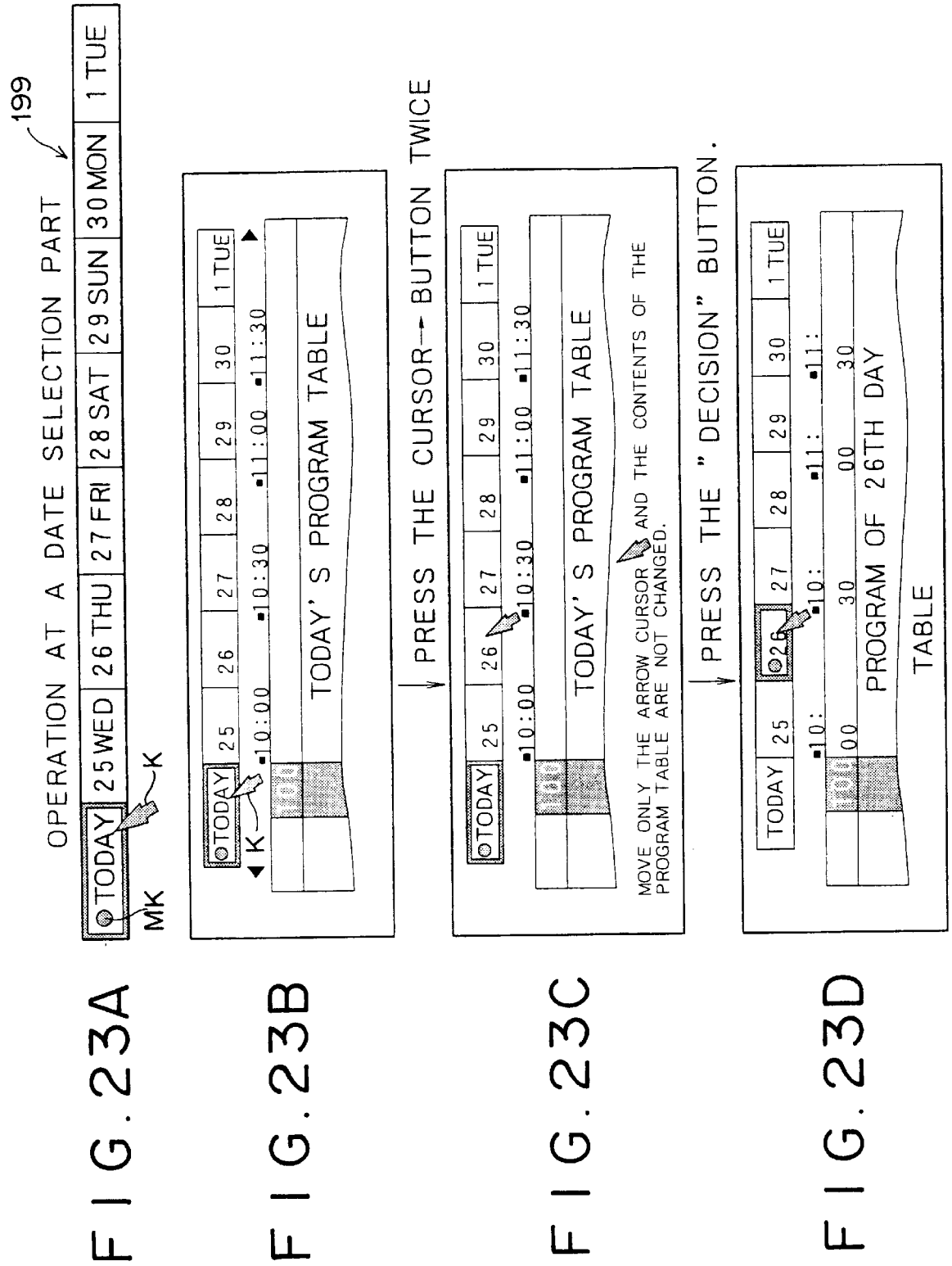

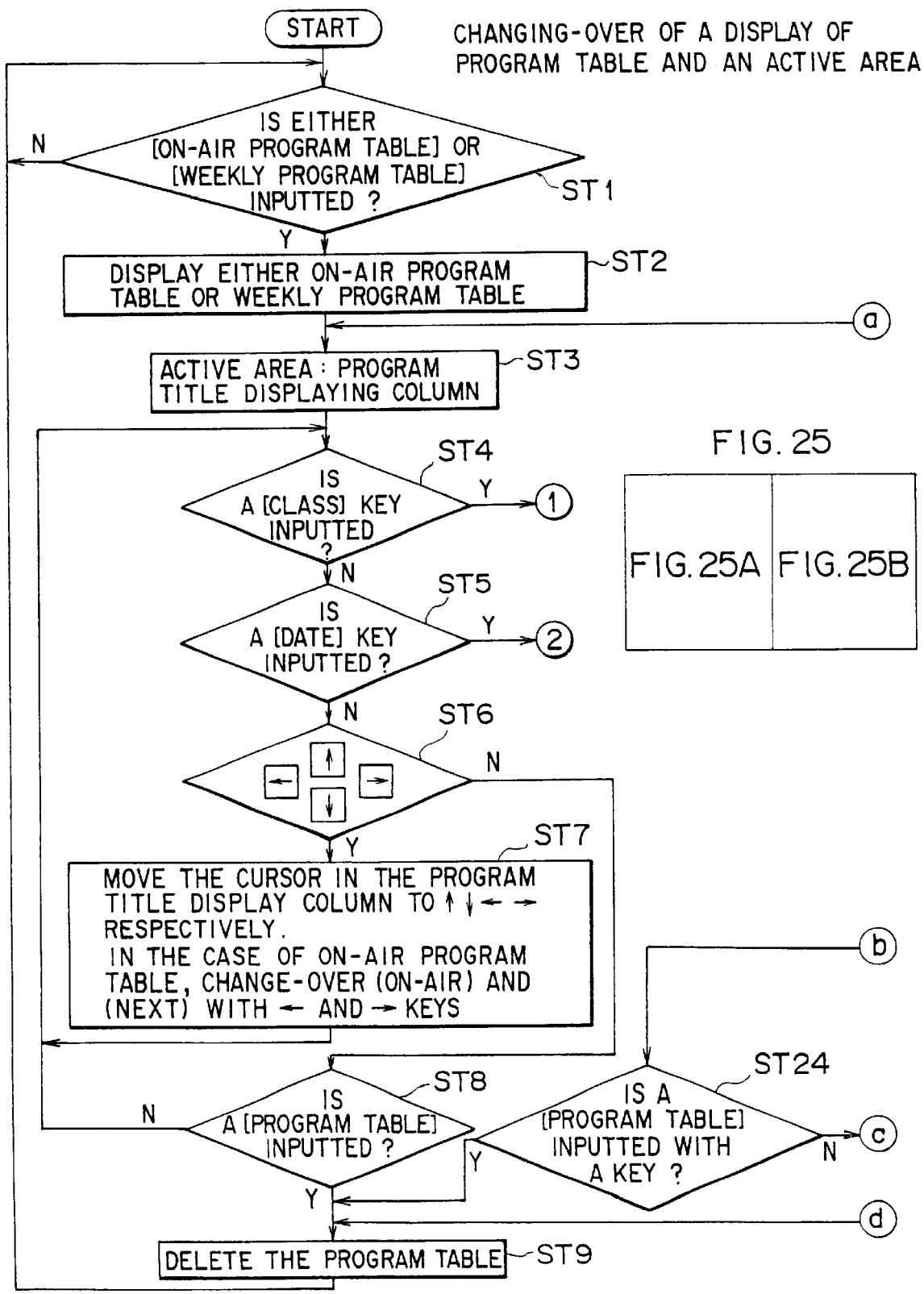

APPARATUS AND METHOD FOR DISPLAYING PROGRAM CONTENTS (EPG)

BACKGROUND OF THE INVENTION

1. Field of the Invention

This invention relates to an apparatus for displaying program contents and a method for displaying program contents in which a table of on-air programs indicating the title of program being on-air and a table of programs of specified period of time indicating the titles of programs to be broadcast within a predetermined period of time can be selected and displayed.

2. Description of Related Art

In recent years, it has been provided a system in which a television broadcasting signal (a broadcasting wave) is changed into a digital signal and broadcast through artificial satellites such as a broadcasting satellite or a communication satellite or the like and received at an individual home. In this type of system, since many channels can be assured, for example, it is possible to broadcast a quite large number of types of programs.

In such a system as described above, since the number of programs which can be broadcast is increased, it is possible that an electronic program guide (EPG: Electronic Program Guide) for use in selecting a desired program is broadcast together with the program, the guide is displayed at a monitor device and a user (viewer) can perform a fast and positive choice of the desired program in reference to the displayed electronic program guide. It is possible for the user to attain a fast and positive recognition and choice of the desired program in reference to the displayed electronic program guide through an application of GUI (Graphical User Interface) on the display unit.

As an electronic equipment, a television set (a television receiver), for example, has been required to show some multi-functions such as displaying many kinds of program contents or a multi-media function operated through a communication network in order to attain a more multi-functional state in it.

Almost all of the electronic program tables also called as an electronic program guide are processed such that all the data (for example, data of about one-week of programs) transmitted through a transponder used in a satellite broadcasting system are edited and displayed.

In view of the foregoing, in the case that the electronic program table was constituted in the prior art in order to decide sort conditions or the like for selecting categories of program, for example, the user returned (moved) to another menu screen other than the electronic program table to set the sort condition, resulting in that the operation of the sort was quite troublesome for the user.

Or, some electronic program table could set the program category setting condition in the same screen. However, in order to move a cursor from the program title displaying section to the category setting section, it was quite troublesome due to the fact that the cursor was moved up to a button on the screen for moving the cursor to the category setting section (either the left end or the right end of the screen or the center position in the screen), a user had to press a button for directing the cursor to the category setting section and further release the cursor from the program title displaying section.

In the case that a user operated the electronic program table through a remote controller unit, for example, the user frequently lost the position of the cursor due to the fact that the cursor could not display a locus of the motion of the cursor during its motion when the cursor was moved from the button on a certain screen to another button on the screen in the case that the pointer display was carried out through the cursor when the cursor was moved in the electronic program table.

Even if it is assumed to set the case in which program categories can be sorted from each other in one screen of the electronic program table, it is estimated that a pop-up window or the like must be newly displayed by moving the cursor to a certain button to determine the category. However, in the case of this prior art system, it is frequently found that a user does not take any notice of presence of a key due to the fact that the key for setting the sort conditions is newly displayed through the pop-up window and further the key is present in the pop-up window.

Since it is not clearly indicated whether the cursor is being moved at the program title displaying section or the cursor is being moved in other sections, i.e. an active area is not distinctly separated from other areas, there is present a certain possibility that the user may not determine which active area is applied as a true active area.

In view of the foregoing, it is an object of the present invention to provide an apparatus for displaying program contents and a method for displaying program contents in which the aforesaid problems are eliminated and a setting of the channel condition or a setting of category can be carried out easily on one screen for both a table of on-air program and a table of program of specified period of time.

SUMMARY OF THE INVENTION

In accordance with the present invention, the aforesaid object is accomplished by the apparatus for displaying program contents characterized in that the same is comprised of a displaying means having a screen; and a selection means for selecting and displaying a table of on-air program for indicating the title of an on-air program being broadcast within a program data supplied through a broadcasting wave and a table of program of specified period of time for indicating the title of the program to be broadcast within a specified period of time and displaying them on the screen of the displaying means in such a way that the table of on-air program and the table of program of the specified period of time may be provided with a channel condition setting section for sorting each of the channels and a category setting section for sorting the category of the program.

In the present invention, the displaying means has a screen. The selecting means may select and display the table of on-air program indicating the title of the program being broadcast within the program data supplied through the broadcasting wave and the table of program of specified period of time indicating the title of program to be broadcast within a specified period of time. In addition, the selecting means can be displayed at the screen of the displaying means in such a way that the table of on-air program and the table of program of specified period of time may be provided with a channel condition setting section for sorting each of the channels and a category setting section for sorting a category of program.

With such an arrangement as above, a user can display any one of the table of on-air program and the table of program of specified period of time and further can display each of the channel condition setting section and the category setting section in one screen even if the table of on-air program is selected or the table of program of specified period of time is selected.

In view of the foregoing, it is possible to set the channel and the category in the table of on-air program in one screen and further to set the channel condition and the category even in the table of program of specified period of time, resulting in that the setting of channel condition or the setting of category can be easily performed.

In the present invention, the table of on-air program preferably has a program title displaying section for indicating a program title, a channel condition setting section and a category setting section, wherein a displayed state in one area selected by a cursor and another displayed state in the other area not selected by a cursor are changed. With such an arrangement as above, a user can judge it positively which area is selected and whether or not the other areas are areas not selected.

In the present invention, the table of program of specified period of time preferably has a program title displaying section for indicating a program title, a channel condition setting section and a category setting section, wherein a displaying state in the area selected by the cursor and a displaying state in the area not selected by the cursor are changed. With such an arrangement as above, a user can clearly discriminate an active area selected by the cursor and an area not selected by the cursor in the table of program of specified period of time.

In the present invention, the locus of motion of the cursor is preferably displayed in the table of on-air program or the table of program of specified period of time in the case that the cursor is used as a pointer indicating a desired indicating area. With such an arrangement as above, the user can easily perform the operation with the cursor without losing the position when the cursor is moved.

In the present invention, as a cell display of each of the program titles constituting the program title displaying section, a terminal processing for the cell display is changed in reference to one state in which the program is started or ended and the other state in which the program is being continued. With such an arrangement as above, it is possible for the user to perform a clear discrimination whether the program is started or finished or the program is being continued or not.

In accordance with the present invention, the aforesaid object is accomplished by the method for displaying the program contents characterized in that each of the table of the on-air program and the table of the program of the specified period of time is combined with a channel condition setting section for sorting the channels and a category setting section for sorting the program categories and is displayed on the screen of the displaying means when the table of on-air program indicating the title of the program being broadcast in the program data supplied through a broadcasting wave and the table of program of the specified period of time indicating the title of the program to be broadcast within the specified period of time are selected.

In accordance with the present invention, each of the table of the on-air program and the table of the program of the specified period of time is combined with a channel condition setting section for sorting the channels and a category setting section for sorting the program categories and is displayed on the screen of the displaying means when the table of on-air program indicating the title of the program being broadcast in the program data supplied through a broadcasting wave and the table of program of the specified period of time indicating the title of the program to be broadcast within the specified period of time are selected.

With such an arrangement as above, in the case that a user selects either a table of the on-air program or a table of the program of specified period of time, the channel condition setting section and the category setting section can be combined to each other and seen in one screen without fail, so that either the channel condition setting or the category setting can be easily performed at either the table of on-air program or the table of the program of specified period of time.

BRIEF DESCRIPTION OF THE DRAWINGS

FIGS. 8A to 8D are views for showing a state in which items in the channel selecting section are selected by a cursor.

FIG. 9 is a view for showing one example of a channel selecting section and a category setting section.

FIG. 10A and 10B are views for showing an example of a cursor moved from the channel selecting section to the category setting section.

FIG. 11 is a view for showing a state in which nothing is selected at the category setting section.

FIG. 14 is a view for showing a manner in which an on-air program and a next program are changed over in the table of on-air program.

FIG. 15 is a view for showing one example of a table of on-air program and a next program in the table of on-air program.

FIG. 16 is a view for showing one example of a table of weekly program (a table of program of specified period of time).

FIGS. 18A to 18E are views for showing an example of display at the title section in the table of weekly program.

FIGS. 19A to 19C are views for showing an example of processing at the end part of screen at the displaying section of the program title in the table of weekly program.

FIGS. 20A to 20D are views for showing an example of display at a displaying section of the program title in the table of weekly program.

FIGS. 21A to 21C are views for showing an example of modification of an operating range of a cursor in the table of weekly program.

FIGS. 22A to 22D are views for showing an example of operation at the channel selecting section in the table of weekly program.

FIGS. 23A to 23D are views for showing an example of operation at a day selecting section in the table of weekly program.

FIGS. 24A to 24F are views for showing an example of operation at the time selecting section in the table of weekly program.

DESCRIPTION OF THE PREFERRED EMBODIMENTS

Figure 1:
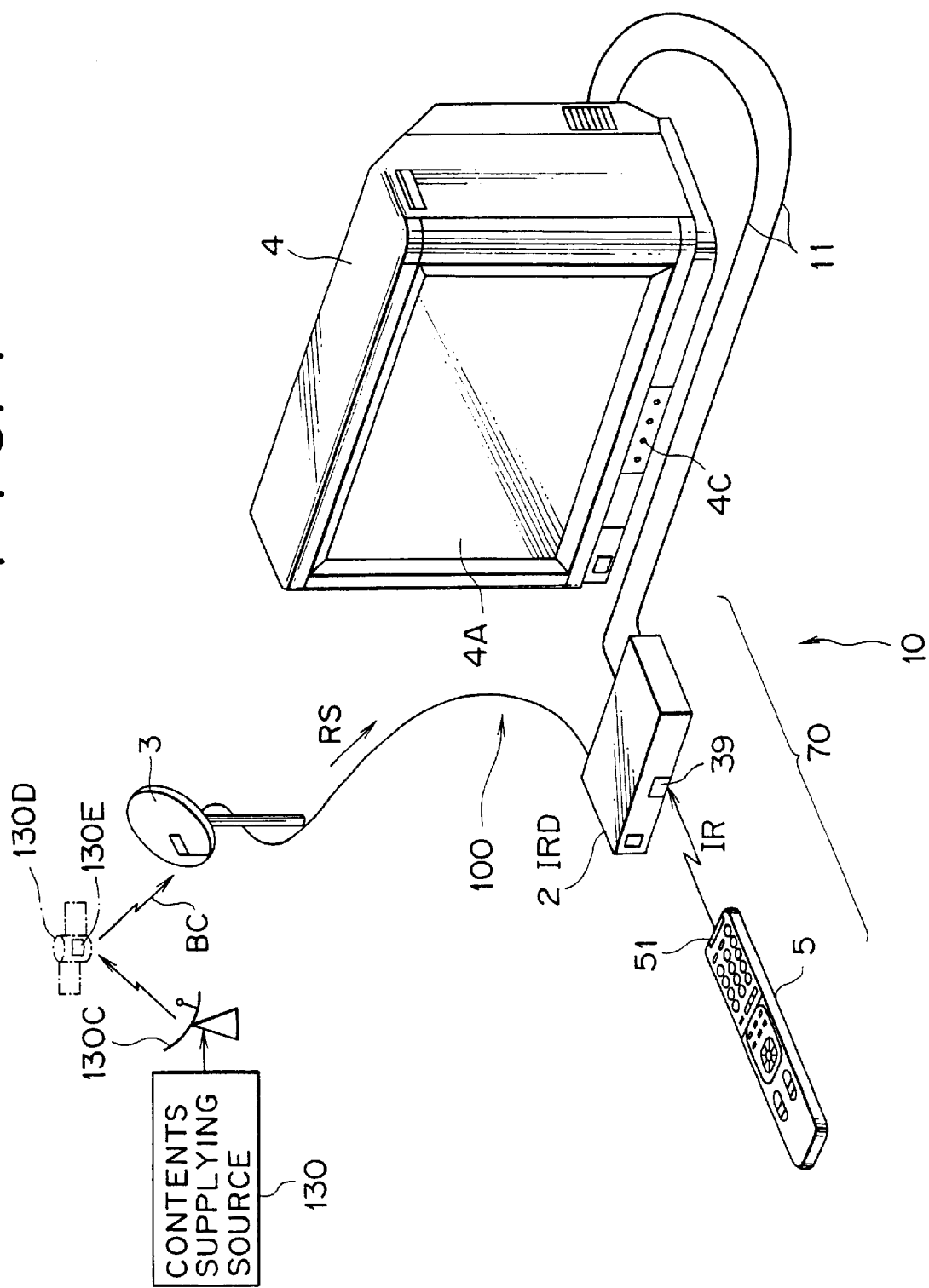
FIG. 1 is a view for showing an electronic equipment including an apparatus for displaying program contents of the present invention.

Referring now to the drawings, the preferred embodiments of the present invention will be described as follows.

Since the preferred embodiments described as follows are practical and preferable examples of the present invention, some technical preferable limitations are applied, although the scope of the present invention is not limited to these forms so long as no description is made for restricting the preferred embodiments in particular.

Figure 2:
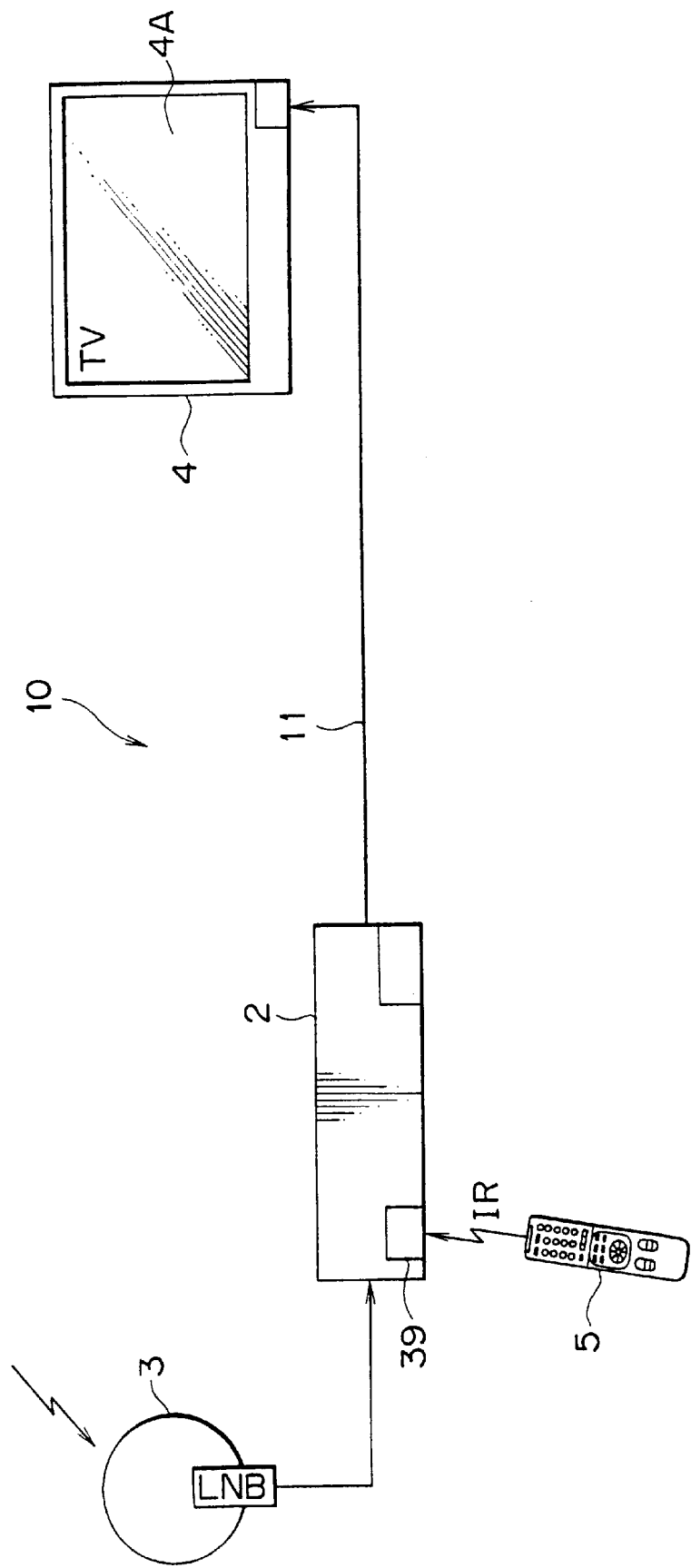
FIG. 2 is a view for showing the apparatus of FIG. 1.

FIGS. 1 and 2 illustrate an audio visual electronic equipment 10 including the preferred embodiment of the apparatus for displaying the program contents of the present invention.

The electronic equipment 10 includes schematically a parabolic antenna 3 and an apparatus 100 for displaying the program contents or the like, wherein the apparatus 100 for displaying the program contents has a monitor device 4 acting as a displaying means, an IRD (Integrated Receiver/Decoder) 2 and a remote commander 5. The IRD 2 and the remote commander 5 may constitute a selecting means 70.

The monitor device 4 is a displaying device provided with a cathode ray tube (CRT), for example. However, it is of course possible that this monitor device 4 is not limited to a displaying device provided with a cathode ray tube, but a liquid crystal displaying device or a plasma displaying device or other kinds of displaying devices can be employed.

The electronic equipment 10 constitutes a part of a digital satellite broadcasting system, for example, wherein the parabolic antenna 3 is operated to enable the broadcasting wave BC transmitted from a parabolic antenna 130C of a contents supplying source (broadcasting enterprises, and passive broadcasting enterprises, for example) to be received at the parabolic antenna 3 through a transponder 130E of a satellite 130D. The received signal RS received at the parabolic antenna 3 is supplied to the IRD 2.

The remote commander 5 may act as an operation input part for a user for the IRD 2, wherein various instructions can be given to the IRD 2 through an infrared ray signal, for example. A user depresses an optional key in a group of keys in the remote commander 5 to be described later, thereby the infrared ray signal IR corresponding to the function of the depressed key is outputted from the IR transmission part 51 and can be received at an IR receiving section 39 of the IRD 2. The IRD 2 is connected electrically to a monitor device 4 by a line 11. The monitor 4 has a screen 4A.

Then, referring to FIG. 3, the remote commander 5 shown in FIG. 1 will be described as follows. The remote commander 5 has various kinds of operation keys shown in FIG. 3, wherein it has a TV power key 5A, a main power key 5B, a channel selection key 5C, a ten-key section 5D, an EPG key 5E, an on-air program table key 5F, a weekly program table key 5G, a date button 5H, a category button 5I, an audio volume key 5J, a channel key 5K, and other keys such as a program description key 5L, a radio key 5M and a menu key 5T or the like.

Figure 3:
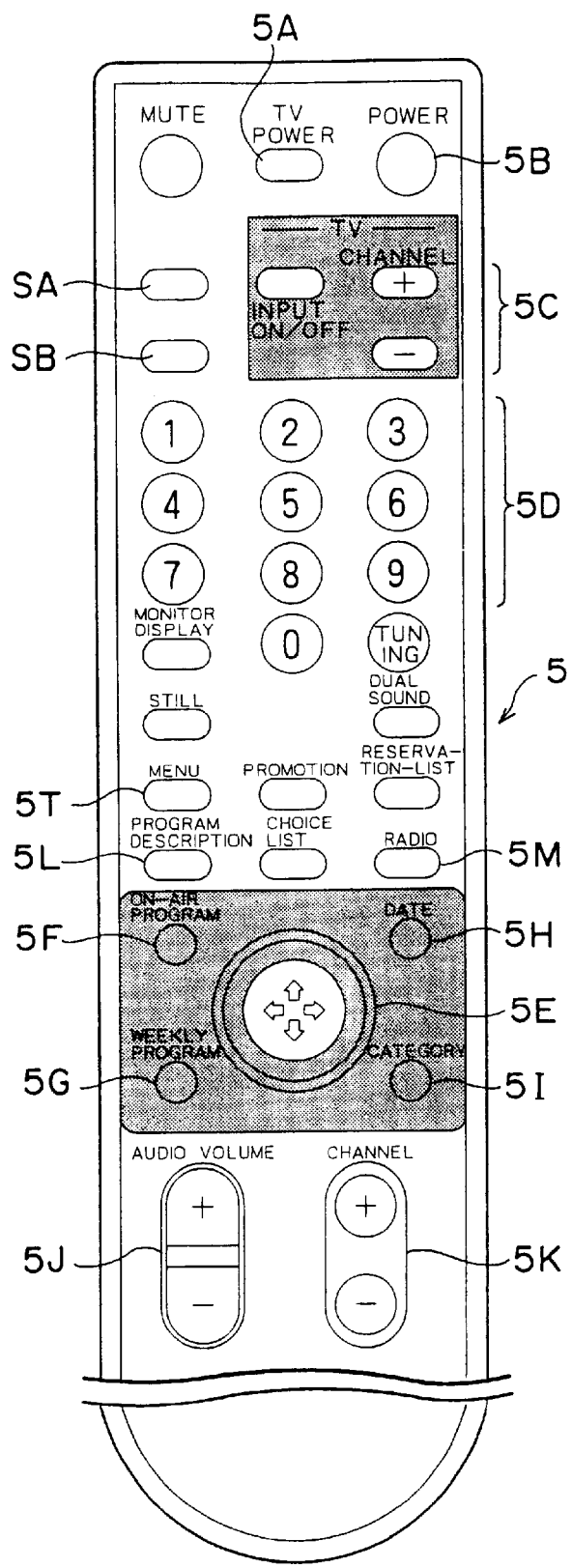
FIG. 3 is a view for showing one example of a remote commander arranged in the apparatus shown in FIG. 1.
Figure 4:
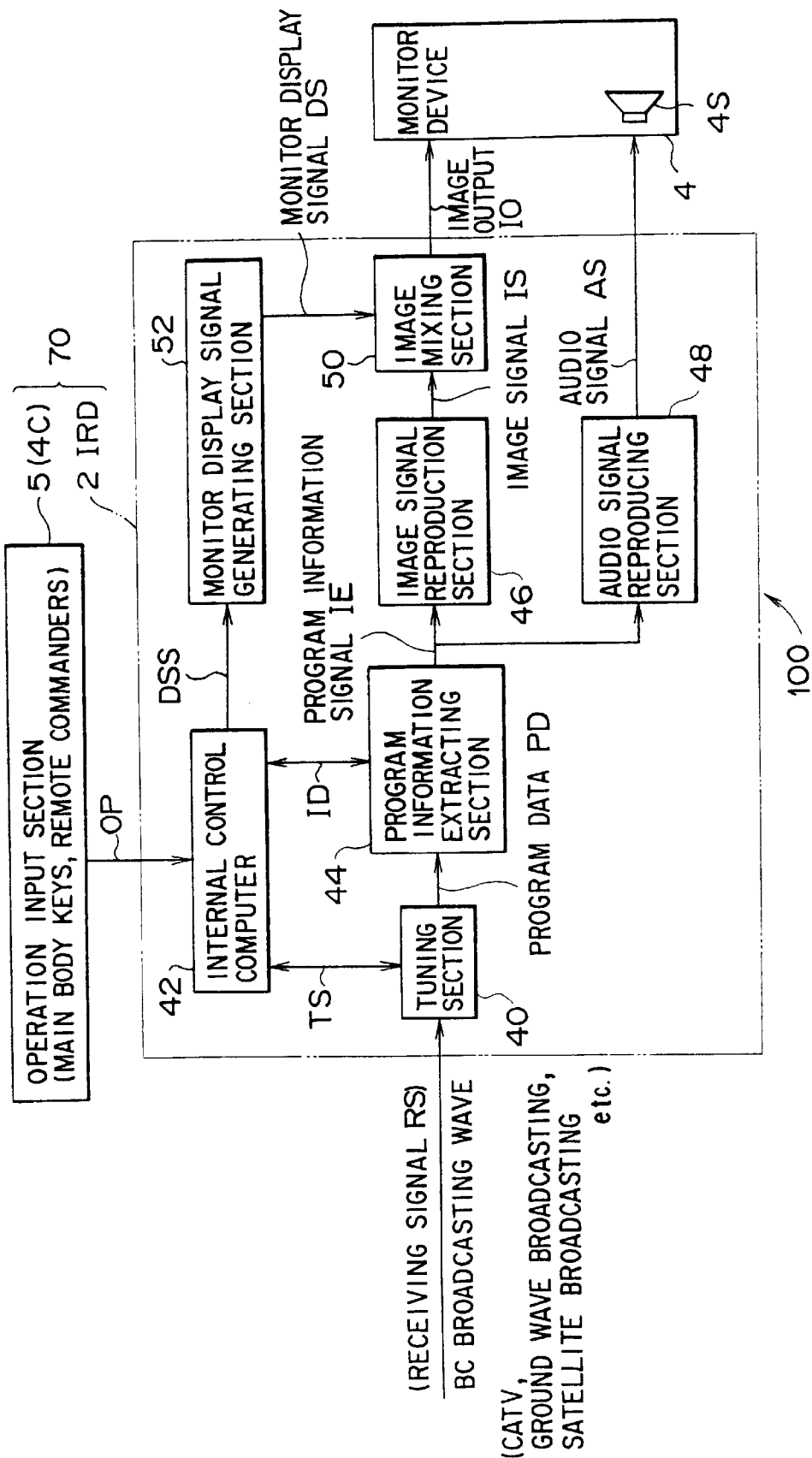
FIG. 4 is a view for showing an example of an internal configuration of the apparatus shown in FIG. 1.
Figure 5:
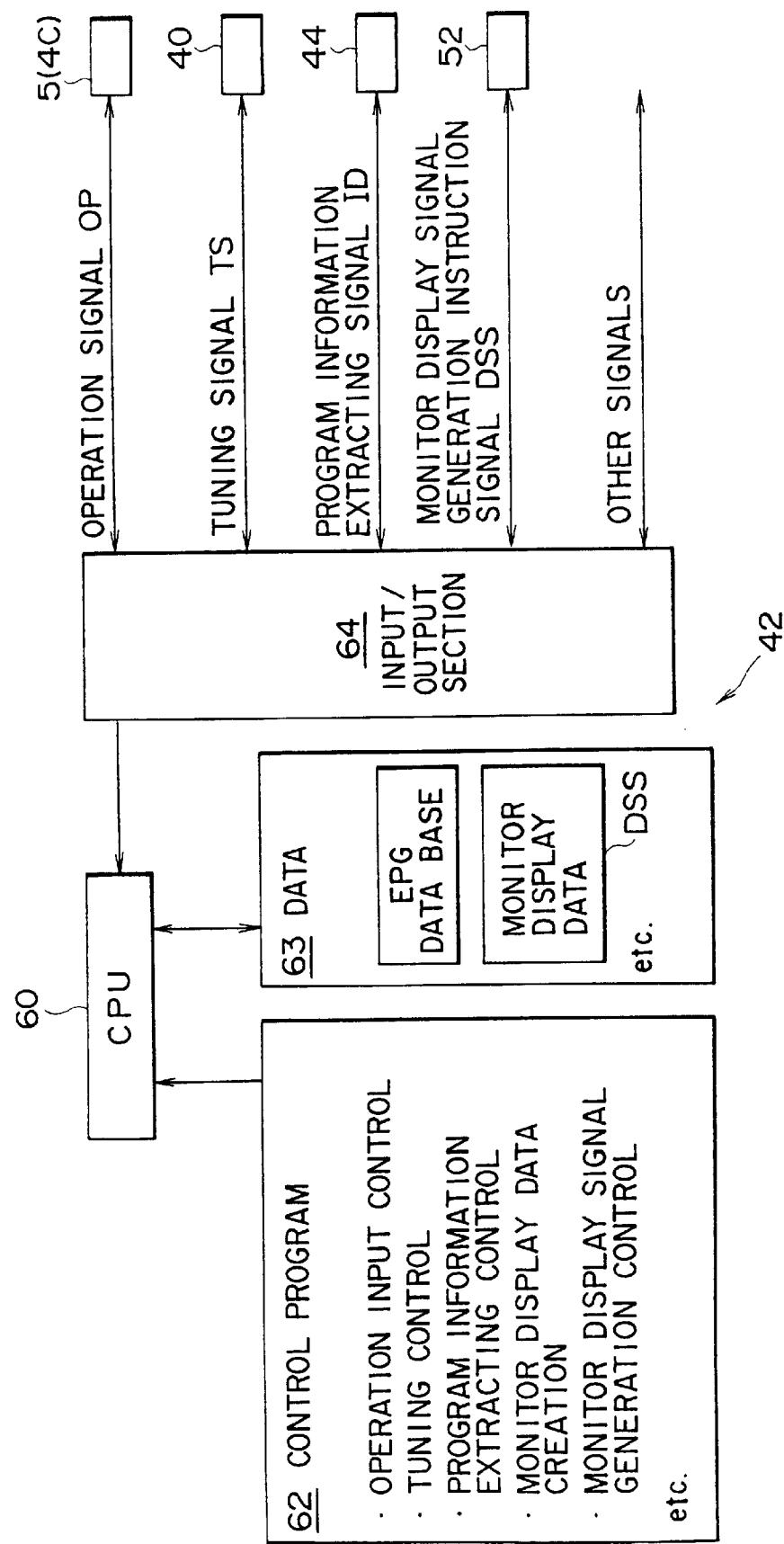
FIG. 5 is a view for showing an example of an internal configuration of an internal control computer of FIG. 4.

Referring to FIGS. 4 and 5, an example of configuration of the remote commander (an operation inputting section) 5, a main body key (an operation inputting section) 4C and the IRD 2 or the like shown in FIGS. 1 to 3 will be described.

The IRD 2 has a tuning section 40 for use in receiving the received signal RS of the broadcasting wave BC. This tuning section 40 can receive the broadcasting wave RC (the received signal RS) such as a cable TV broadcasting wave (CATV), a ground broadcasting wave and a satellite broadcasting wave or the like, for example. The tuning section 40 is connected to an internal control computer 42 and a program information extracting section 44. The program information extracting section 44 is connected to an image signal reproduction section 46 and an audio signal reproducing section 48, wherein the image signal reproduction section 46 is connected to a monitor device 4 through an image mixing section 50. The audio signal reproducing section 48 is connected to a speaker 4S in the monitor device 4.

The internal control computer 42 is connected to a monitor display signal generating section 52, wherein the monitor display signal generating section 52 is connected to an image mixing section 50.

Although the tuning section 40 receives the received signal RS of the broadcasting wave BC as described above, the tuning section 40 performs a control over the tuning for the received signal RS in response to any one of CATV, the ground broadcasting wave and the satellite broadcasting wave under an instruction attained from the internal control computer (a micro-computer) 42.

The program information extracting section 44 extracts a program information extracting signal ID from the program data PD in the received signal RS given from the tuning section 40, sends it to the internal control computer 42 and concurrently extracts the program information signal IE. Since this program information signal IE has information data about image or audio, the image signal reproduction section 48 reproduces an audio sound AS and supplies it to output an audio output against the speaker 4S of the monitor device, for example.

To the image mixing section 50 is supplied the image signal IS and further a monitor display signal DS is supplied to it from a monitor display signal generating section 52. The monitor display signal generating section 52 receives a data DSS from the internal control computer 42, makes various kinds of data for production of a display screen as the monitor display signal DS and mixes the monitor display signal DS with the image signal IS by the image mixing section 50.

The image mixing section 50 can supply an image output IO having the monitor display signal DS mixed with the image signal IS against the monitor device 4. Not only the monitor display signal DS made by the monitor display signal generating section 52 under an instruction from the internal control computer 42 but also the ON-OFF control for display at the screen 4A of the monitor device 4 can be carried out by a method wherein the internal control computer 42 gives an instruction to the monitor display signal generating section 52.

In addition, the program information extracting signal ID sent from the program information extracting section 44 to the internal control computer 42 is applied as a data base for EPG.

Figure 6:
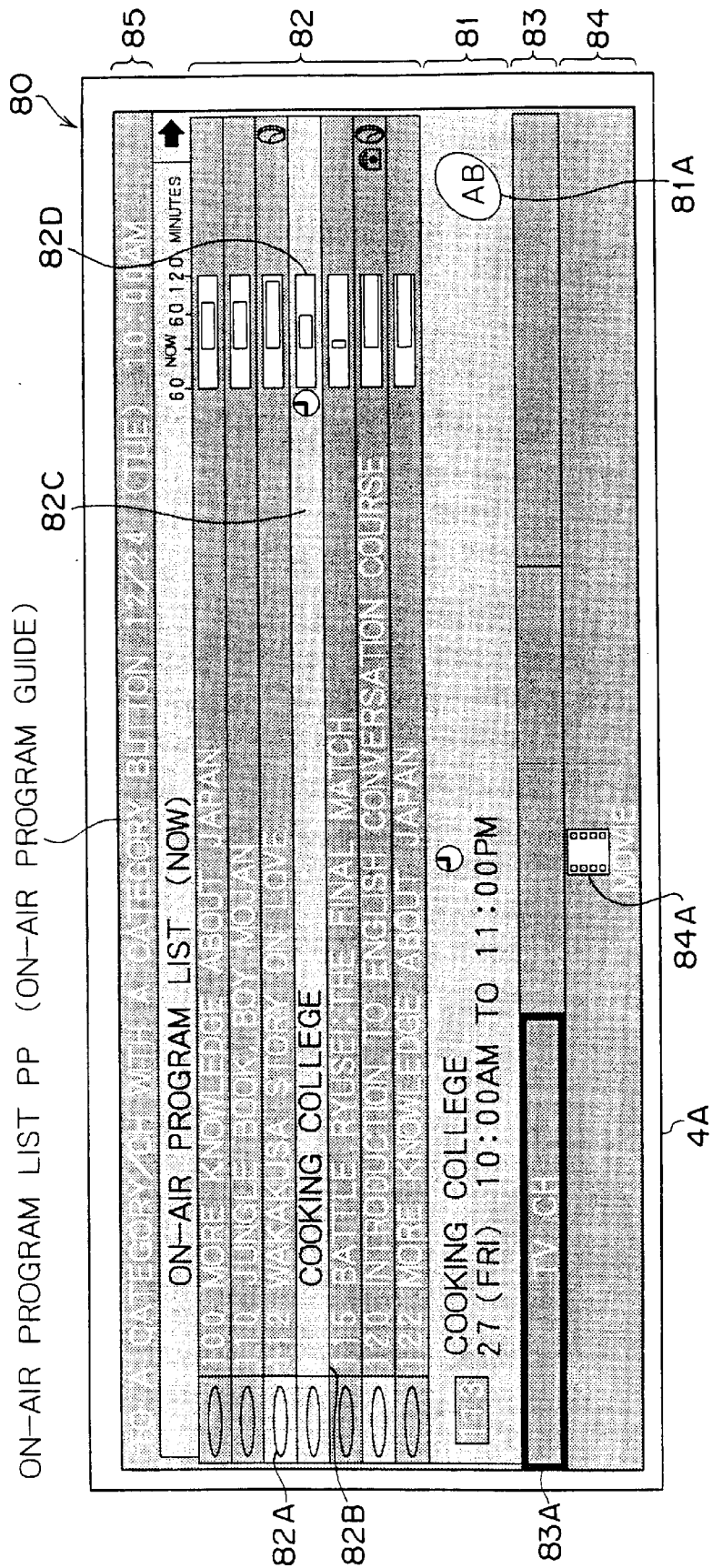
FIG. 6 is a view for showing one example of the table of on-air program.

The internal control computer 42 may display the electronic program table to be displayed at the monitor screen shown by the internal control computer 42 indicated in FIG. 6, for example, at the screen 4A shown in FIG. 1 in response to the contents of operation input under an instruction from the remote commander 5 shown in FIGS. 1 and 2 or a user's instruction from the main body key 4C of the monitor device 4 shown in FIG. 1 and may also display, the program data PD and the program information signal IE or the like.

FIG. 5 shows an example of the internal configuration of the internal control computer 42 of FIG. 4, wherein the CPU (central processing unit) 60 can take in a control program 62 and further the CPU 60 can perform giving or receiving information against data 63. Further, the CPU 60 is connected to an input/output section 64.

The input/output section 64 can receive an operation signal OP from either the main body key 4C or the remote commander 5. The input/output section 64 can give or receive a tuning signal TS in respect to the tuning section 40. The input/output section 64 can give or receive the program information extracting signal ID with respect to the program information extracting section 44. The input/output section 64 supplies the data DSS against the monitor display signal generating section 52.

The control program 62 shown in FIG. 5 contains some control programs such as an operation input control for performing a control operation under an operation input from the main body key 4C or the remote commander 5 acting as the operation input section, a tuning control concerning the tuning section 40, a program information extracting control at the program information extracting section 44, a control over creating monitor display data corresponding to the monitor display signal generating section 52 and a control over generating a monitor display signal or the like.

Data 63 includes EPG data base or data DSS to be displayed at the monitor screen or the like. Either the main body key 4C or the remote commander 5 acting as the main body input section shown in FIG. 4 and the IRD 2 constitute a selecting means 70 for selecting the table of on-air program PP indicating the title of on-air program being broadcast shown in FIG. 6, for example, and a weekly program guide WP shown in FIG. 16 and displaying them at the screen 4A of the monitor device 4 shown in FIG. 1.

Then, referring to FIG. 6, one example of the on-air program (the on-air program guide) PP which can be displayed on the screen 4A of the monitor device 4 shown in FIG. 1 will be described.

The on-air program table PP is displayed in the screen 4A and further the program 80 being received at present is also displayed at the screen 4A. The on-air program table PP is superimposed on the on-air program 80 being received at present and displayed. Further, in the case that the on-air program table PP is displayed while being overlapped on the program 80 being received at present, a viewer can see to a certain degree the program 80 being received through the on-air program table PP due to the fact that the on-air program table PP is formed in its opaque state. In other words, the on-air program table PP is superimposed on the program 80 being received in its opaque state.

The on-air program table PP has a function to see the title of the program being broadcast at present as well as its broadcasting time and then a user can tune the desired program from this list.

The on-air program table PP is schematically divided into the following five sections.

(1) Program Information Section 81

The program information section 81 can display detailed information of a specified program selected at the display section 82 to be described later, a help message and a network logo (this is displayed as AB, for example, in FIG. 6) or the like. The network logo is a name of network such as a satellite broadcasting station or an identification displaying part for a broadcasting enterprise or an identification displaying section for an authorized broadcasting enterprise, for example.

(2) Program Title Displaying Section 82

Program title displaying section 82 can display a station logo 82A, a channel number 82B, a program title 82C and a broadcasting time display bar 82D or the like.

The broadcasting time display bar 82D is a broadcasting time elapsing display section, wherein a user can understand easily a broadcasting elapsing time in a visual manner by changing a size of displaying area in response to an elapsing of the broadcasting time, for example. The broadcasting time display bar 82D is a so-called bar graph displaying type.

(3) Channel Selecting Section (Channel Condition Setting Part) 83

Channel selecting section 83 shown in FIG. 6 displays buttons for determining a channel selected at a program title displaying section 82. Television channel determining button 83A can select a television channel, for example, and has some buttons for determining other preference channels or buttons capable of selecting a radio channel or the like. In the example shown in FIG. 6, the television channel determining button 83A is determined through selection by position setting of a cursor.

(4) Category Setting Section 84

Category setting section 84 shown in FIG. 6 may sort the programs in the on-air program table PP in reference to the corresponding category and display them. In the example shown in FIG. 6, a category 84A of movie is sorted and displayed. This category setting section 84 is also arranged at a program table NP shown in FIG. 9 planned to be broadcast next. In the case that a viewer wants to set a category, the viewer depresses the category button 5I shown in FIG. 3.

(5) Present Time/Operation Display Section 85

Present time/operation display section 85 shown in FIG. 6 displays a help guide for a method of key operation or the present day and time or the like.

As described above, the present program table PP superimposed on the program 80 being received at present and further displayed in such a way that the contents of the program 80 being received can be seen in transparent manner.

Figure 7C:
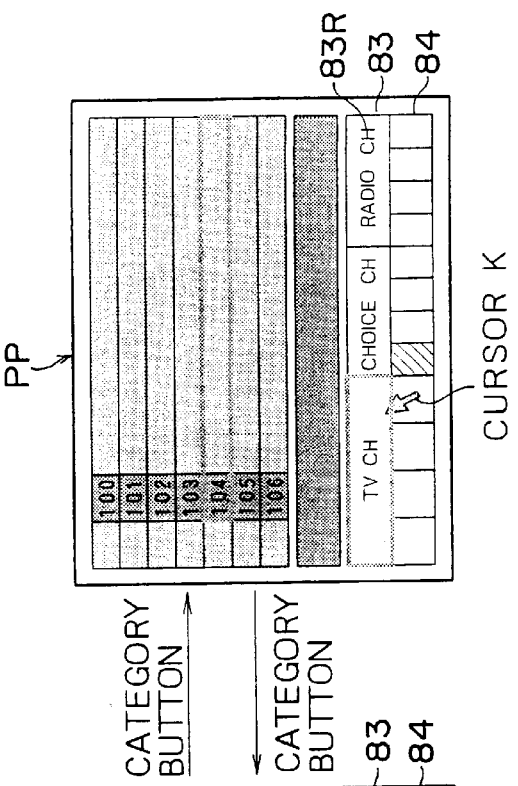
FIGS. 7A to 7D are views for showing an example of modification in an active area of a cursor in the table of on-air program.
Figure 7D:
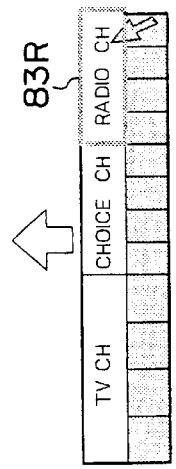
Figure 7B:
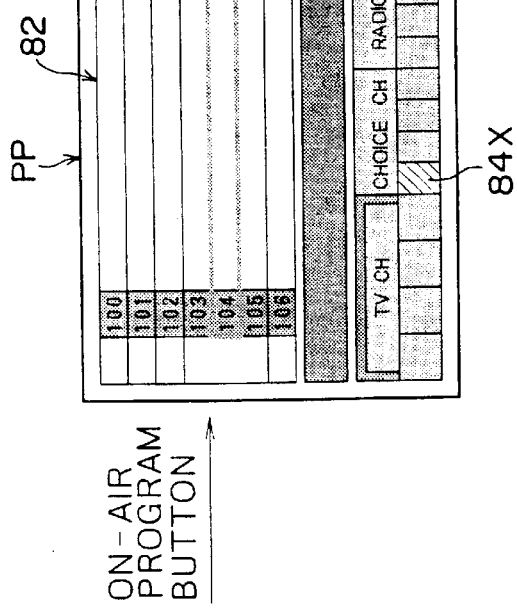
Figure 7A:
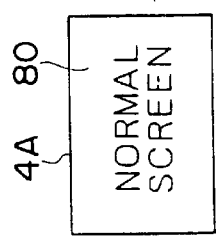

Then, referring to FIGS. 7A to 7D, wherein FIG. 7A displays a normal screen, the program 80 being received and shown in FIG. 6, for example, and this figure shows an example in the case that under this state, the present program table PP is superimposed on the program 80 being received as shown in FIGS. 7B and 7C and an area where the cursor is operated is changed.

In order to change the state from the program 80 being received in FIG. 7A to the state shown in FIG. 7B, a user depresses the present program table button (key) 5F in FIG. 3. Under the initial state shown in FIG. 7B, since the program title displaying section 82 is selected by a cursor, both the channel selecting section 83 and the category setting section 84 show a darker tone as compared with that of the program title displaying section 82. However, in the case that a specified category 84X is present at the category setting section 84, the specified category 84X displays a specified color.

In the case that the state is changed in FIGS. 7B and 7C, a user can change the state by depressing the category button 5I in FIG. 3.

In FIG. 7C, since the cursor K selects the channel selecting section 83, a color tone in the program title displaying section 82 at this time is set to be more dark as compared with that of the channel selecting section 83. The position of the cursor K is displayed by an arrow cursor. However, in the case that a radio channel 83R within the channel selecting section 83 is selected, the channel setting section 84 becomes dark as shown in FIG. 7D.

In addition, in the case that a user depresses the present program button 5F from the state of the program 80 being received at the normal screen in FIG. 7A, the program title displaying section 82 shown in FIG. 7B is displayed under a state in which it is selected in advance.

In FIGS. 8A to 8D is shown an example of a state in which the cursor K is moved at the channel setting section 83.

At the initial position where the program guide is opened and the present program table PP is displayed, the cursor K is set at a position of the television channel 83T in the case that the program 80 being received just before displaying the present program table PP is a program having some images and in turn in the case that the TV is receiving a program having no image but having audio, the cursor K comes to the position of the radio channel 83R. In the case that the program guide is opened at a subsequent second time or the like, the program guide can be opened at the position of the cursor set in the previous time.

In the case that the cursor K is moved as shown in FIGS. 8A to 8C, the cursor can be moved by depressing a rightward arrow mark or a leftward arrow mark in the EPG key 5E in FIG. 3. However, in the case that the cursor K is moved at the rightmost position, the depressed state is ignored whatever times the rightward arrow mark key may be depressed. Similarly, in the case that the cursor K is present at the leftmost position, the depressed state is ignored whatever times the leftward arrow mark may be depressed. In other words, the cursor can move one by one in either the rightward or leftward direction in the television channel 83T, the preference channel 83S and the radio channel 83R. Then, the user depresses EPG key 5E in FIG. 3 to enable the user to determine the position of the cursor K and then the television channel 83T is displayed at that position, for example, in reverse state.

As shown in FIG. 8D, motion of the arrow-shaped cursor K is carried out such that a segment between a starting point P1 and a terminal point P2 is equally divided to prevent the user from losing the cursor when the cursor is moved, and the cursor K is moved for every 40 ms, for example.

In the case of one motion of the cursor within the channel selecting section 83 and the other motion of the cursor between the channel selecting section 83 and the channel setting section 84, the moving range of the cursor K is divided into five segments and the cursor is moved for every 40 ms. In addition, the motion of the cursor within the category setting section 84 is divided into three segments and the cursor is moved for every 40 ms.

Then, referring to FIGS. 9 and 10A and 10B, wherein FIG. 9 shows a channel selecting section 83 and a category setting section 84 in their enlarged views. As the television channel 83T is selected by the cursor K, it is possible to arrange the programs having some images therein at the program title displaying section 82 shown in FIG. 6 in an order of the channels. When the preference channel 83S is selected by a cursor 84, it is possible to arrange the channels selected by the user under the setting of the preference channel at the program title displaying section 82 in an order of channel numbers.

When the radio channel 83R is selected by the cursor K, the programs having no image but having audio signals are displayed at the program title displaying section 82 in the order of the channels.

As the downward arrow mark in EPG key 5E in FIG. 3 for the cursor K is depressed from the position at the channel selecting section 83, the cursor is moved from within the category setting section 84 to the second position from the left side, for example. This state is shown in FIGS. 10A and 10B. When the cursor K is moved from the television channel 83T, for example, the cursor K can be moved to the position 84M indicating the category of movie at the slant leftward and lower side. If the selected channel is the preference channel 83S, it is possible to move the cursor to the category of culture 84E shown in FIG. 9.

As the upward arrow mark in EPG key 5E shown in FIG. 3 is depressed from the category setting section 84 shown in FIG. 9, the cursor is moved to the corresponding button at the channel setting section 83. In the case that the cursor is moved from the sports, movies, music and news, the cursor is moved to the television channel 83T and then the cursor is moved from the overseas broadcasting, culture, children/ education and dramas to the preference channel 83S.

Figure 12A:
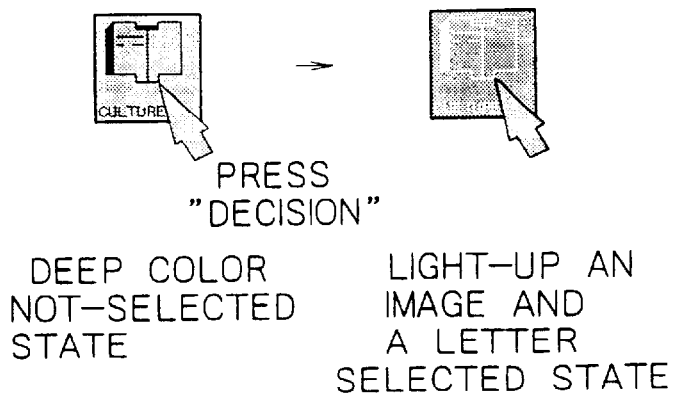
FIGS. 12A to 12B are views for showing a state in which a selection is carried out at the category setting section.
Figure 12B:
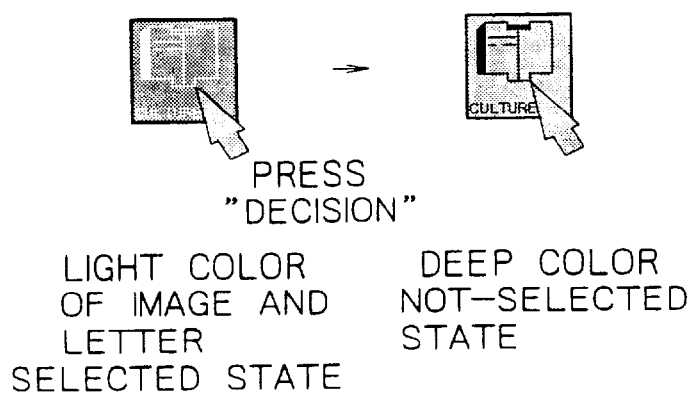

FIG. 11 indicates a state in which any one of the categories are not selected at the category setting section 84 and all the defaults are indicated by dark tone color (a state in which nothing is selected). When EPG key 84 in FIG. 3 is depressed at the category setting section 84, it is possible to select one of the categories which the user wants to sort at the program title displaying section 82 shown in FIG. 6. The arrow-shaped cursor K is moved onto the category which the user wants to sort and then the user depresses EPG key 5E. It is possible to reverse the color every time the decision is carried out as shown in FIG. 12A or 12B. For example, the dark color which is not selected can be reversed to a selected state in which the image and the letters are made bright. If the decision is performed once again, it is possible to change the selected bright state to the dark color state not selected as shown in FIG. 12B.

Figure 13:
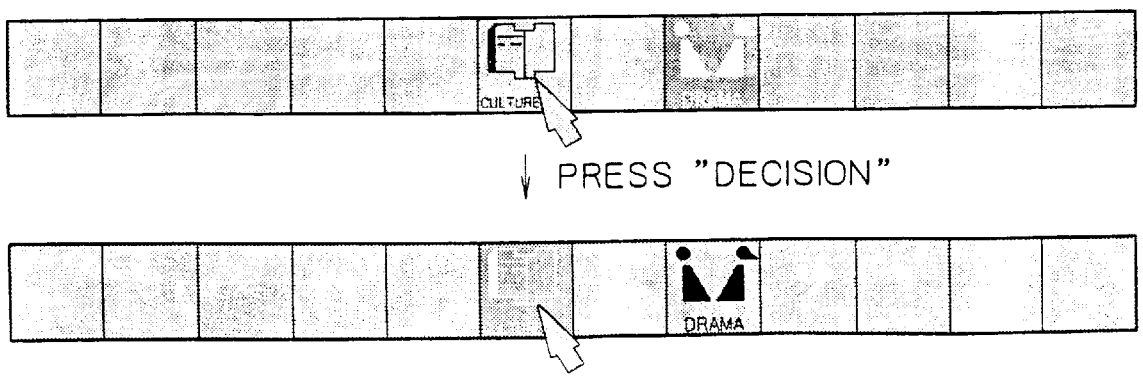
FIG. 13 is a view for showing a state in which a selection is carried out at the category setting section.

FIG. 13 shows a state in which a certain category is already selected and another category is newly decided and is pressed to cause the former category to be null and then the new selected category is made effective. When the category is decided, only the program in the decided category is sorted from the programs in the channel indicated in FIG. 9, for example, and then displayed at the program title displaying section 82 shown in FIG. 6. In the case that no category is selected at all, all the programs in the channel selected at the channel selecting section 83 are displayed. If the program corresponds to any one of the present program table indicating the program being broadcast (the present on-air program) and a next present program table indicating the programs planned to be broadcast next, this program is displayed as an item to be sorted. However, the program title not corresponding to the table is not displayed and the category name is enclosed by parentheses and displayed. When the category is decided, its result is reflected at once at the program title displaying section 82. In the case that the present program table PP is once passed and displayed again, the category set in the previous operation is turned off and a new operation is started at the default state (a state in which nothing is selected).

FIG. 14 shows one example of the present program in the aforesaid present program table PP and the next program (a next program) in the present program table PP. In the case that there is a program not corresponding to the selected category, that program is enclosed by parentheses. That is, FIG. 15 shows an example of a case in which the category corresponds to both the present program and the next program, an example of another case in which the category corresponds to the next program only, an example of a still further case in which the category corresponds to the present program only and finally an example of a yet still further case in which the category does not correspond to any of them, respectively. In the case that the category corresponds to the program, it is displayed as it is, and in turn in the case that the category does not correspond to the program, it is displayed while being enclosed by parentheses. Also in the case that the program of the corresponding category is ended when the screen showing the result of sorting operation is kept displayed, the channel is not deleted, but kept displayed. In addition, even if the program of the corresponding category is started at another channel, the channel is not increased, but it is reflected when the program guide is once passed by and it is displayed again.

Then, FIG. 16 shows a weekly program guide (a weekly program table) WP which is different from the present program table PP shown in FIG. 6. This weekly program table WP is one example of a program table for a specified period of time, wherein the programs planned to be on-air in one week can be displayed.

The weekly program table WP can display the program titles of one week or two weeks or more as described above, for example, and then a viewer can tune a program, perform a confirmation of detailed information about the program and its reservation as well. In the screen shown in FIG. 16, the weekly program table WP has a program title displaying section 182, a program information section 181, a channel selecting section 183, a category setting section 184, a time selecting section 187, a present time/operation displaying section 185 and a day selecting section 199 or the like.

The program title displaying section 182 can display only the channel selected by the channel selecting section 183. In the weekly program table WP, a mere moving-up or moving-down motion of the cursor enables the channel to be selected. In addition, rightward or leftward motion of the cursor enables time to be selected and further motion of the cursor enables the day to be changed.

At the day selecting section 199, the aforesaid changing of the day can be carried out directly at a high speed. Also at the time selecting section 187, the time changing operation can be carried out at a high speed.

The program information section 181 can display the detailed information of the program of one program title in the program title displaying section 182. In this section, a network logo 181A can be displayed as "AB", for example.

The channel selecting section 183 has the same function as that of the channel selecting section 83 shown in FIG. 6, and further the category setting section 184 has the same function as that of the category setting section 84 shown in FIG. 6. Display concerning the present time or operation can be carried out at the present time/operating section 185.

Figure 17:
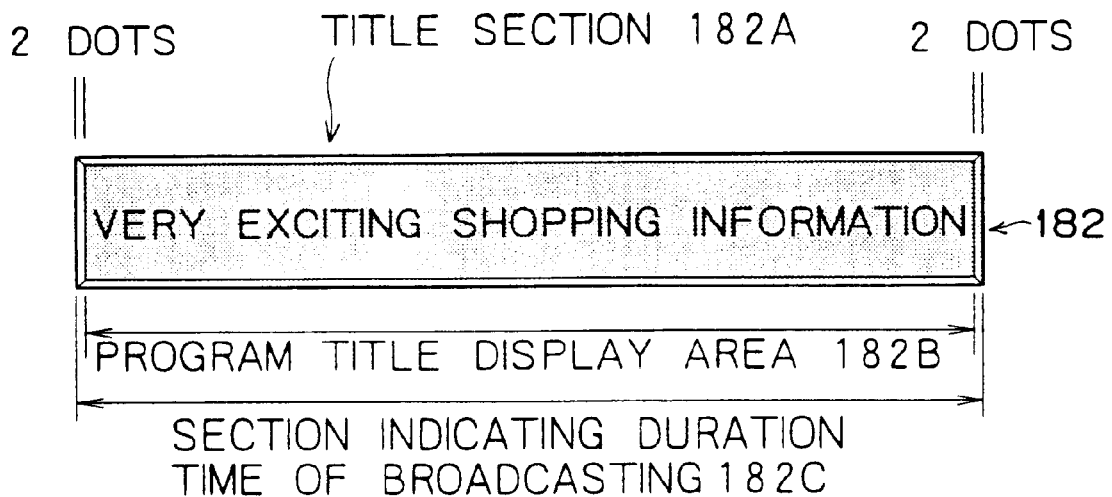
FIG. 17 is a view for showing an example of display at a title section in the table of weekly program.

FIG. 17 shows an example of display of one program title section 182A in the program title displaying section 182. One program title section 182A has a program title displaying area 182B and a segment 182C expressing a duration of the broadcasting time. The title section 182A can display a program name (a program title) at the program title displaying area 182B. The section 182C expressing the duration of the broadcasting time in the program title displaying area 182B in the example shown in FIG. 17 has an increased width only by a total number represented by 4 dots of 2 dots on a first side and 2 dots on a second side.

FIG. 18A indicates the displaying section 181D of minimum time in which the duration of broadcasting time of the program is expressed in a unit of minute and one minute is displayed by 4 dots. One program may express a duration of broadcasting time including an edge portion. As the program title displaying area 182D, a minimum number of 4 dots is required. Accordingly, 8 dots =2 minutes including the edge portion and becomes a minimum duration time which can be expressed. All the programs having the broadcasting time of less than 2 minutes are expressed as programs with duration time of two minutes.

If two continuous programs with one minute broadcasting time appear, only one program is displayed. When the cursor is moved in a lateral direction at that location, the cursor is depressed twice and then the cursor is moved to a next location. In FIGS. 18B to 18E are shown examples in which two consecutive programs of one minute are present, wherein FIG. 18B shows a case in which when the two consecutive programs of one minute are applied, the rightward arrow button in EPG key 5E in FIG. 3 is depressed to move the cursor and finally the state shown in FIG. 18C is attained. The rightward arrow mark button is further depressed from the state shown in FIG. 18C to move the cursor in a rightward direction, the location of the cursor is not changed as shown in FIG. 18D, but the contents at the program information section 181 in FIG. 16 are set t be the next program. Further, the rightward arrow mark button is depressed to move the cursor and then the button is further depressed once again as shown in FIG. 18E, resulting in that the program displaying section is moved next.

FIGS. 19A to 19C show one example of processing performed at the screen end portion of the program title displaying section 182 in FIG. 16. The end part of the title section 182A of the program title displaying section 182 is provided with edges 182G and 182F, respectively. That is, an edge 182G is formed at a portion where the title section 182A starts, and an edge 182F is formed at a portion where the title section 182A ends. In the case that the title section 182A displaying a certain title just starts at 10:00 PM, for example, an edge 182G is formed in correspondence with 10:00 and in the case that the program ends just at 0:00, the edge 182F is formed at that part.

In the example of display shown in FIG. 19B, no edges are arranged at both ends of the title section 182A. That is, in this case, the program with the program title indicated at the title section 181A is broadcast in a continuous manner.

In FIG. 19C, the program starting at 10:00 PM and ended at 10:00 or 10:02 that is, a program just after the former program having one minute or two minutes, is displayed by 2 dots, but the program title is not displayed. Similarly, in the case that the program starts at 11:58 or 11:59, the program is displayed in 2 dots, but this is the case in which a program just before the former program continues one minute or two minutes, so that the program title is not displayed.

FIGS. 20A to 20D illustrate examples of display of the program title section 182A. The program titles are inputted into the program title displaying area 182B of the title section 182A and if the long program title can not be displayed, point marks of ( . . . ) are inputted. In the case that the program is not reserved, a clock mark is inputted at the head segment of the program title. In the case that only one letter of full size is inputted, only point marks of ( . . . ) are inputted. However, if the program is already reserved, a clock mark WM is inputted. In the case that a length of the program title displaying area 182B is less than 1 letter of full-size, nothing is displayed.

FIGS. 21A to 21C illustrate an example in which an operating range of the cursor at the weekly program table WP in FIG. 16 is changed. In this case, the category button 5I and the date button 5H in FIG. 3 are used. When the date button 5H in FIG. 3 is depressed at the weekly program table WP kept at the default state (a state in which nothing is selected) shown in FIG. 21A, it becomes a state shown in FIG. 21B. That is, the date selecting sections 199 and 187 become bright and they are selected as a cursor operating range, although the program title displaying section 182, the channel selecting section 183 and the category setting section 184 become dark and they are not selected as a range where the cursor can be operated.

To the contrary, if the category button 5I in FIG. 3 is depressed under a state shown in FIG. 21A, only the channel selecting section 183 and the category setting section 184 are selected as an operating range of the cursor, although other sections are not selected and kept dark. As described above, in FIG. 21A, either the date button or the category button is depressed under a state in which only the program title displaying section 182 is selected as the operating range of the cursor, and it is possible to change the operating range of the cursor as shown in FIGS. 21B and 21C.

FIGS. 22A to 22D illustrate examples of operation at the channel selecting section 183 in the weekly program table WP in FIG. 16. FIGS. 22A to 22D show the arrangement in which the operation can be carried out in the same manner as that of the selection of the cursor in FIG. 8 which has already been described above, and the television channel 183T, the preference channel 183S and the radio channel 183R can be properly selected under motion of the cursor K. In addition, as shown in FIG. 22D, the cursor K is moved for every 40 ms, for example, in the same manner as that shown in FIG. 8D by a method wherein a segment between the starting point P1 and the end point P2 is equally divided into some sections so as not to cause the cursor K to be lost. Since other items are performed in the same manner as that of the present program table PP shown in FIG. 8, the description related to FIG. 8 is also applied as a description in reference to FIG. 22. However, when EPG key 5E in FIG. 3 acting as a decision button in FIGS. 22A, 22B, 22C is depressed and defined, a yellow mark YM, for example, is displayed at the selected channel.

FIGS. 23A to 23D illustrate one example of the date selecting section 199 in the weekly program table WP in FIG. 16, wherein the cursor K is operated by operating either the rightward arrow mark or the leftward arrow mark of EPG key 5E shown in FIG. 3 and by depressing EPG key 5E, resulting in that the date can be determined. The yellow mark YM, for example, is attached to the determined date and the contents of the program title displaying section 182 in FIG. 16 are revised. The program title displaying section 182 can be changed in the same time band as that before changing the data and displaying the program table for the date. FIGS. 23A and 23B illustrate an example of variation of the program in the case that the date described above is changed.

As the cursor K in FIG. 23B is moved from today to 26th day in FIG. 23C and further it is revised while the today's program table is being displayed, only the program data in the same time as that specified by the day after one week, for example, is displayed.

Figures 24A, 24B, 24C, 24D, 24E, 24F:
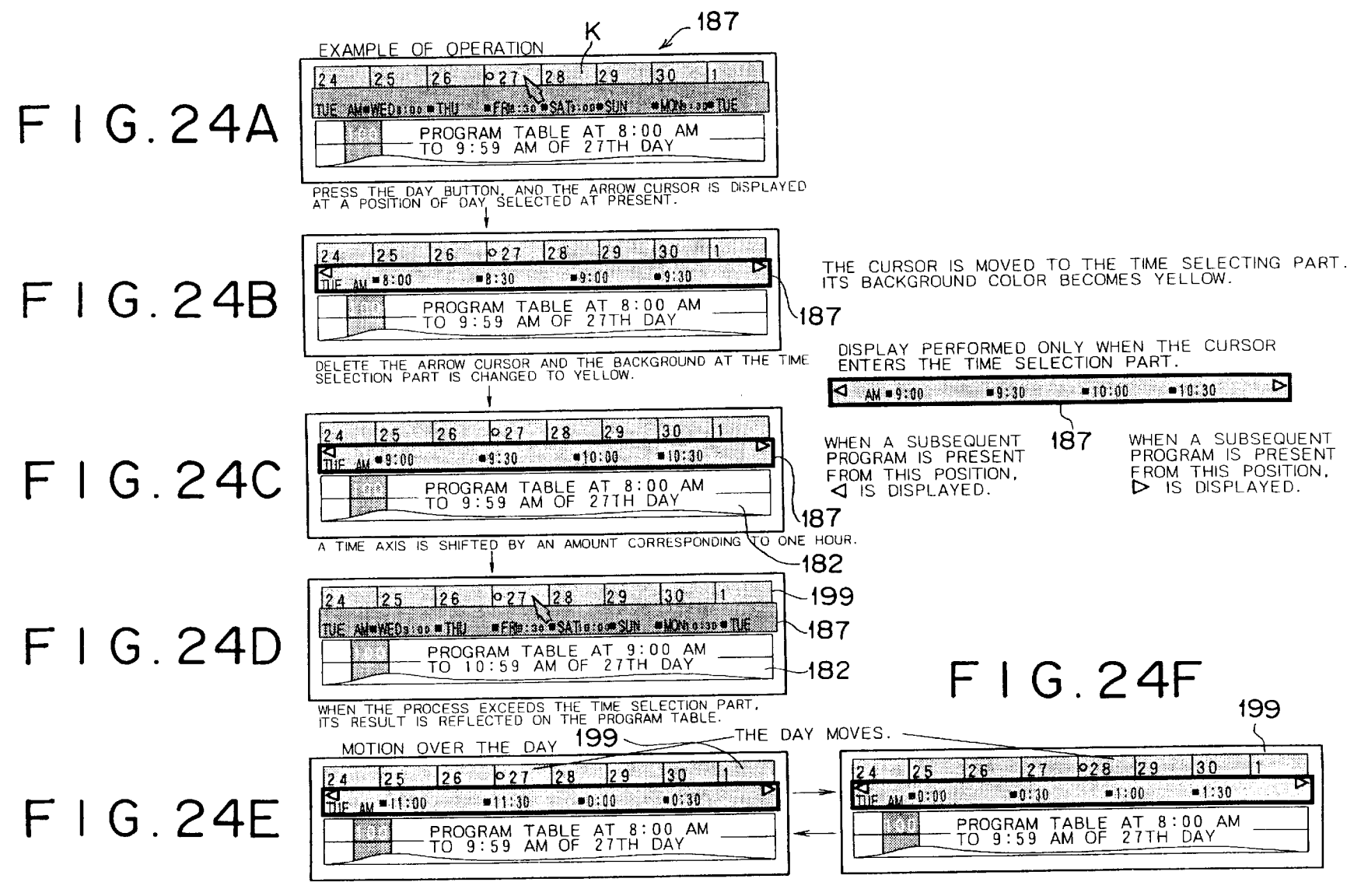

FIGS. 24A to 24F illustrate an example of displaying of the time selecting section 187 in the weekly program table WP shown in FIG. 16. In the case that the cursor is present in the program title displaying section 182 shown in FIG. 16, the date button 5H shown in FIG. 3 is depressed, resulting in that the cursor K is displayed at a position of the date being selected at present, for example, the location of 27th day. When the lower arrow mark in EPG key 5E shown in FIG. 3 is depressed at any positions in the date selecting section 187, the arrow mark cursor K is diminished, the time selecting section 187 shows a yellow background as shown in FIG. 24B, for example, and the time can be changed. That is, the arrow mark cursor is diminished and the background of the time selecting section 187 is changed to yellow color.

In FIG. 24C, as either the rightward arrow mark or the leftward arrow mark of EPG key 5E in FIG. 3 in the time selecting section (a time selecting area) 187 is depressed, it is possible to move a time axis in a unit of one hour. However, it is not moved before the present time. In the time selecting section 187, when EPG key 5E in FIG. 3 is depressed, the weekly program table WP is displayed as shown in FIG. 24 under the conditions of the date selecting section 199 and the time selecting section 187.

Reflection of the result changed by the time selecting section 187 against the program table is carried out in the case described below. That is, this is carried out when the decision button (EPG key 5E in FIG. 3) in the time selecting section 187 is depressed and the upward arrow mark in EPG key 5E for the cursor is depressed and released to cause the date button 5H in the date selecting section 199 to be selected by the cursor K and it is returned back to the program.

When the leftmost end time is 11:00 PM as shown in FIG. 24E, the rightward arrow mark in EPG key 5E in FIG. 3 is depressed to enable the cursor at the date selecting section 199 to be advanced by one day. To the contrary, as shown in FIG. 24F, when the leftmost end time is 0:00, the leftward arrow mark in EPG key 5E for the cursor is depressed and, the cursor at the date selecting section 199 can be returned back by one day.

Further, the time selecting section 187 may perform a displaying operation only when the cursor enters the time selecting section 187.

Next, referring to FIG. 25, one example of the displaying at the present program table PP shown in FIG. 6 and the weekly program table WP shown in FIG. 16 or operation of the category setting section and operation of the channel selecting section will be described as follows. The button to be described below may also be called as a key.

Figure 25B:
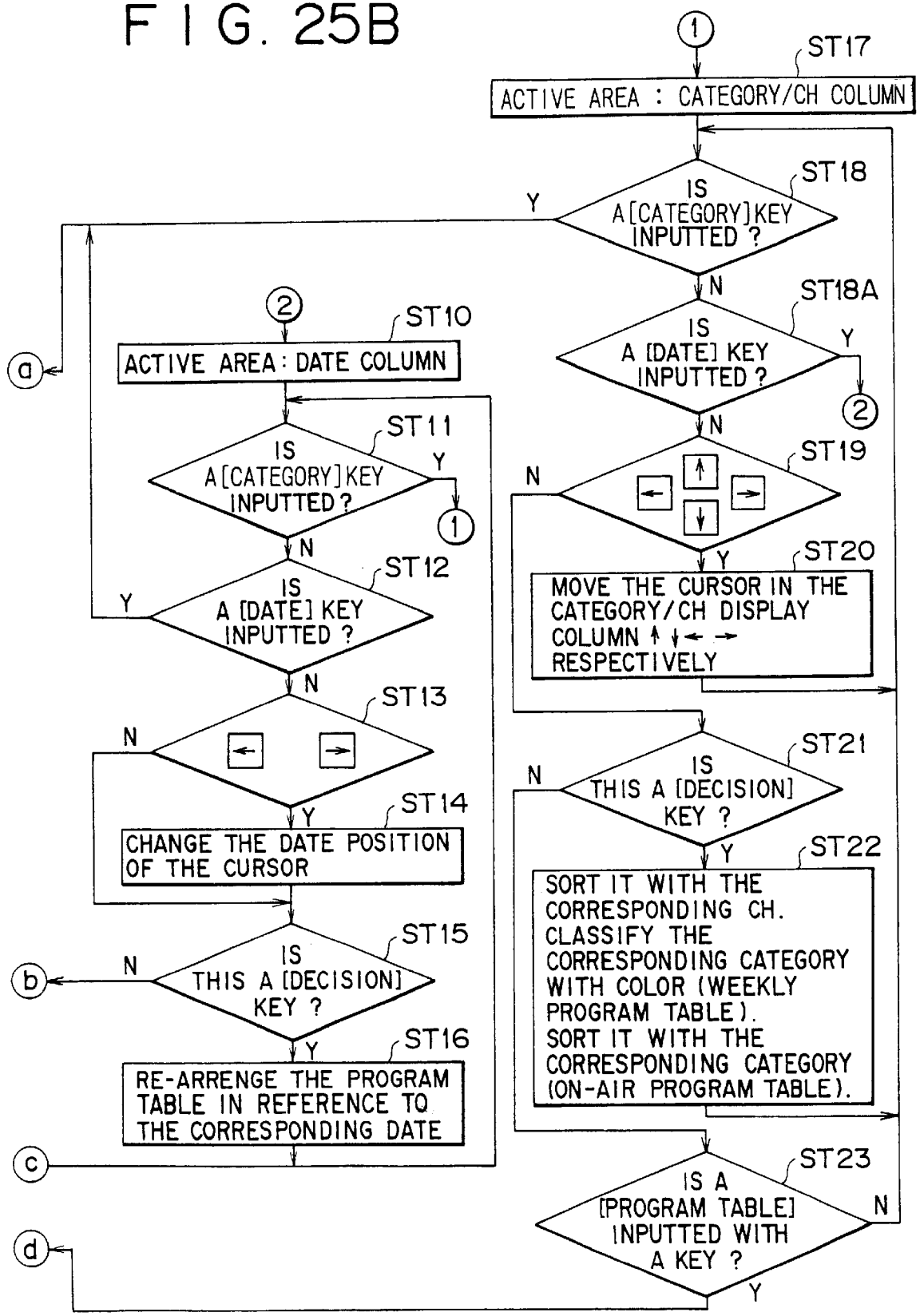
FIG. 25 is a view for showing one example of the table of present program, the table of weekly program and an order of operation at the category setting section and the channel selecting section.

Either the present program table 5F or the weekly program table key 5G shown in FIG. 3 is selected by a user and depressed and, either the present program table PP shown in FIG. 6 or the weekly program table key 5G shown in FIG. 16 is selected at a step ST1 shown in FIG. 25.

With such an arrangement as above, at a step ST2, either the present program table PP or the weekly program table WP is displayed at the screen 4A in FIG. 1. At a step ST3, an active area where the cursor K can move in either the present program table PP shown in FIG. 6 or the weekly program table WP shown in FIG. 16 is set at either the initial program title displaying section 82 or 182.

At a step ST4, in the case that the category button 5I shown in FIG. 3 is not depressed and further at a step ST5, the date button 5H shown in FIG. 3 is not depressed, the operation advances to a step ST6.

At a step ST6, as a user selects and depresses any of the rightward arrow mark, the leftward arrow mark, the upward arrow mark and the downward arrow mark in EPG key 5E, the cursor can be moved in either the up-down directions or the lateral directions in the program title displaying section 82 shown in FIG. 6 or the program title displaying section 182 shown in FIG. 16. Further, as shown in FIG. 14, either the rightward arrow mark or the leftward arrow mark is operated in the present program table to enable the present program (now) and a next program to be changed over from each other (a step ST7).

In the case that EPG key 5E is not operated at a step ST6, the operation is transferred to the step ST8 and the present program table key 5F in FIG. 3, for example, is inputted to enable either the present program table PP or the weekly program table WP to be deleted from the screen 4A as indicated at a step ST9.

In the case that a user depresses the category button 5I at a step ST4 in FIG. 25, the operation is transferred to a step ST17 and in the case that a user depresses the date button 5H at a step ST5, the operation is transferred to a step ST10.

In the case that a user depresses the category button 5I at a step ST4, an active area of the cursor K in either the present program table PP or the weekly program table WP shown in FIGS. 6 and 16 shown at a step ST17 is set initially at either the category setting sections 84, 184 or the channel selecting sections 83, 183, respectively.

As the category button 5I shown in FIG. 3 is inputted at a step ST18, the operation returns to a step ST3, although in the case that the category button 5I is not inputted and the date button 5H is depressed at a step 18A, the operation is transferred to the step ST10.

To the contrary, in the case that the date button 5H is not depressed at a step ST18A, the operation is transferred to a step ST19 and in the case that a user operates the rightward arrow mark, the leftward arrow mark, the upward arrow mark and the downward arrow mark in EPG key 5E, the operation is transferred to a step ST20, and the cursor K can be moved in up-and-down directions or lateral directions at the category setting sections 84, 184 and the channel selecting sections 83, 183, respectively.

In the case that any keys in any directions in EPG key 5E are not depressed at a step ST19, the operation is transferred to a step ST21, and when EPG key 5E is depressed by a user as the decision key, the program titles are sorted in reference to the corresponding channel at either the channel selecting section 83 or 183, the category in the corresponding program title in the weekly program table WP in FIG. 16 is classified by color and the program title is sorted in reference to the corresponding category in the present program table PP shown in FIG. 6.

In the case that the decision key is not depressed at a step ST21, the operation returns back to a step ST18 unless the program table button is depressed at a step ST23, although in the case that the button is depressed, the operation is transferred to a step ST9 so as to delete either the present program table or the weekly program table from the screen.

Next, in the case that the date button 5H is depressed at either the step ST5 or the step ST18A, the active area where the cursor K can be moved at the step ST10 becomes the date selecting section 199 shown in FIG. 16 and if the category button 5I shown in FIG. 3 is depressed, the operation is transferred to a step ST17.

To the contrary, in the case that the category button 5I is not depressed and the date button 5H is depressed, the operation is transferred to the step ST3, although if the date button 5H is not depressed, the operation is transferred to the step ST13. At the step ST13, a user depresses either the rightward arrow mark or the leftward arrow mark in EPG key 5E shown in FIG. 3 to enable the date position of the cursor to be changed at a step ST14 within the date selecting section 199.

Upon completion of operation at a step ST14 or in the case that an operation at the step ST13 is not carried out, the operation is transferred to a step ST15 and in the case that EPG key 5E is not depressed, the operation is transferred to a step ST16.

Upon completion of arrangement of the weekly program table in reference to the corresponding date at a step ST16, the operation is returned back to a step ST11.

In the case that EPG key 5E acting as the decision key is not depressed at a step ST15, the operation is transferred to a step ST24 and in the case that the program table button is depressed, the program table is deleted from the screen 4A at the step ST9.

In the electronic program table (EPG) displayed at the display screen of an image forming equipment, concurrent conditions of the category and the channel while the program table being displayed can be sorted without changing-over the screen shown to a viewer. Due to the facts that the display at the menu screen is not changed over or a new window is not displayed, it is apparent at a glance that a user may not lose the operation at the program table or the sorting can be carried out in the program table.

It is possible that the program table is not limited to the program title list, the displayed program can be sorted under a combination of the type of channel and the condition of channel, they can be performed easily within one screen to enable the sorting operation to be carried out, they may be transmitted to a user at one glance and further it is not necessary for the cursor to be moved up or down or in a lateral direction, resulting in that the sorting condition can be set by a simple operation in an easy manner.

When the cursor is moved (selection of program) in the program title displaying column, a category key is inputted and when the operation is transferred to the setting such as a category/channel condition or the like, the area where the cursor becomes active is made clear through its brightness or darkness, thereby the setting operation can be carried out by a user without being confused under application of the cursor.

When the cursor is moved, its locus is made to be appeared to enable the operation to be easily carried out without losing the cursor.

Since the expression of cell expressing the individual program in the program title displaying column causes whether the program is started or finished within a time range at the program table or the program is still continued or not to be made apparent at a glance, a user may not misunderstand a duration of the program. In case of setting reservation of program, a user may not misunderstand a program having a true two-hour duration time as another program having one hour. Or the user may not misunderstand whether the program is started at that time or the program is just started at that time at the left end.

As described above, all the items are related to improve a convenience in use at a user's side and they maybe considered effective.

What is claimed is:

1. An apparatus for displaying program contents, comprising:

displaying means having a screen; and selecting means for selecting and displaying a present program table indicating titles of programs being presently broadcast in program data supplied through a broadcasting wave, for selecting and displaying a program table regarding a specified period of time and indicating the titles of the programs to be broadcast within a predetermined period of time, and for displaying the present program table and the program table regarding the specified period of time in the screen of the displaying means so that the present program table and the program table regarding the specified period of time is provided with a channel condition setting section for sorting the titles of the programs by channel and a category setting section for sorting the titles of the programs by category, wherein cell displays including the titles of each of the programs constitute a program title displaying section; and the cell displays indicate a first state wherein at least one of a start time and a finish time of the programs is indicated and a second state wherein the programs are continuing such that no start time and no finish time are indicated.

2. The apparatus for displaying program contents according to claim 1, wherein:

the present program table includes a program title displaying section indicating the titles of the programs;

the channel condition setting section, the category setting section, and a state of a display are changed in reference to a first area selected by a cursor and a second area not selected by the cursor.

3. The apparatus for displaying program contents according to claim 1, wherein:

the program table regarding the specified period of time includes a program title displaying section indicating a the titles of the programs; and the channel condition setting section, the category setting section, and a state of a display are changed in reference to a first area selected by a cursor and a second area not selected by the cursor.

4. The apparatus for displaying program contents according to claim 1, wherein a locus of motion of a cursor is displayed at one of the present program table and the program table regarding the specified period of time, when the cursor is used as a pointer for indicating a desired indicating area.

5. A method for displaying program contents, comprising the steps of:

selecting and displaying a present program table indicating titles of programs being presently broadcast in program data supplied through a broadcasting wave and a program table regarding a specified period of time and indicating the titles of the programs to be broadcast within a predetermined period of time;

combining each of the present program table and the program table regarding the specified period of time with a channel condition setting section for sorting the titles of the programs by channel and a category setting section for sorting the titles of the programs by category; and displaying the present program table and the program table regarding the specified period time at a screen of a displaying means, wherein cell displays including the titles of each of the programs constitute a program title displaying section, and the method further comprises the step of changing the cell displays in reference to a first state indicating at least one of a start time and a finish time of the programs and a second state indicating the programs are continuing with no start time and no finish time of the programs indicated.

6. The method for displaying program contents according to claim 5, wherein the present program table includes a program title displaying section for indicating the titles of the programs, the channel condition setting section, and the category setting section and wherein the method further comprises the step of changing one of a brightness and a darkness of a display in reference to a first area selected by a cursor and a second area not selected by the cursor.

7. The method for displaying program contents according to claim 5, wherein the program table regarding the specified period of time includes a program title displaying section for indicating the titles of the programs, the channel condition setting section, and the category setting section and wherein the method further comprises the step of changing one of a brightness and a darkness of a display in reference to a first area selected by a cursor and a second area not selected by the cursor.

8. The method for displaying program contents according to claim 5, further comprising the step of displaying a locus of motion of a cursor at one of the present program table and the program table regarding the specified period of time, when the cursor is used as a pointer for indicating a desired indicating area.

\* \* \* \* \*